United States Patent [19]

Hamstra et al.

[11] Patent Number: 4,530,055
[45] Date of Patent: Jul. 16, 1985

[54] HIERARCHICAL MEMORY SYSTEM WITH VARIABLE REGULATION AND PRIORITY OF WRITEBACK FROM CACHE MEMORY TO BULK MEMORY

[75] Inventors: James R. Hamstra, Plymouth; Merlin L. Hanson, Arden Hills, both of Minn.

[73] Assignee: Sperry Corporation, New York, N.Y.

[21] Appl. No.: 354,559

[22] Filed: Mar. 3, 1982

[51] Int. Cl.³ .......................... G06F 13/00; G06F 9/06
[52] U.S. Cl. ..................................................... 364/200
[58] Field of Search ... 364/200 MS File, 900 MS File; 365/230, 235

[56] References Cited

U.S. PATENT DOCUMENTS

| 4,020,466 | 4/1977 | Cordi et al. | 364/200 |
| 4,044,337 | 8/1977 | Hicks et al. | 364/200 |
| 4,077,059 | 2/1978 | Cordi et al. | 364/200 |
| 4,084,231 | 4/1978 | Capozzi et al. | 364/200 |
| 4,168,541 | 9/1979 | Dekarske | 365/230 |
| 4,394,732 | 7/1983 | Swenson | 364/200 |
| 4,394,733 | 7/1983 | Swenson | 364/200 |
| 4,420,807 | 12/1983 | Nolta et al. | 364/200 |
| 4,467,411 | 8/1984 | Fry et al. | 364/200 |

Primary Examiner—James D. Thomas
Assistant Examiner—A. E. Williams, Jr.
Attorney, Agent, or Firm—Griffin, Branigan & Butler

[57] ABSTRACT

In a hierarchical memory system, replacement of segments in a cache memory is governed by a least recently used algorithm, while trickling of segments from the cache memory to the bulk memory is governed by the age since first write. The host processor passes an AGEOLD parameter to the memory subsystem and this parameter regulates the trickling of segments. Unless the memory system is idle (no I/O activity), no trickling takes place until the age of the oldest written-to segment is at least as great as AGEOLD. A command is generated for each segment to be trickled and the priority of execution assigned to such commands is variable and determined by the relationship of AGEOLD to the oldest age since first write of any of the segments. If the subsystem receives no command from the host processor for a predetermined interval, AGEOLD is ignored and any written-to segment becomes a candidate for trickling.

11 Claims, 41 Drawing Figures

Fig. 3

| | 0 1 2 3 | 4 5 6 | 7 8 9 10 | 11 12 13 14 15 | 16 17 18 19 20 21 22 23 | 24 25 26 27 28 29 30 31 |
|---|---|---|---|---|---|---|
| SBCMDQ | D B 0 0 0 | N C Q | 0 0 0 | DEVICE NUMBER | NEXT SEQUENCE NUMBER | |
| SBCMQH | ACTIVE COMMAND REQUEST NUMBER 0→ | | | | SEEK IN PROGRESS REQUEST NUMBER 0→ | 0 X X X |
| SBCMQI | HOST ID | F L | PRI | SEQUENCE NUMBER | S C D S I F E A P A R C Q M E S P H 2 T D W | T MODE R D K | REQ NO. |
| SBCQT2 | | | NSEG | 0 0 0 0 | SEGMENT DEVICE RELATIVE ADDRESS | |
| SBCFQ3 | 0 0 | | 0 0 | | FILE NUMBER | |
| | | | | | ENTRIES 2-6 | |
| | | | | | ENTRY 7 | |

Fig. 2

| | 0 1 2 3 | 4 5 6 7 | 8 9 10 11 | 12 13 14 15 | 16 17 18 19 20 21 22 23 24 25 26 27 28 29 30 31 |
|---|---|---|---|---|---|
| SBSDT1 | HOST | DEVICE NUMBER | 0 0 0 0 | | SEGMENT DEVICE RELATIVE ADDRESS |
| SBSDT2 | V T W L A T D C K | L B A L | G F T R | R L I F A B T D D S R | B O L H D L | HASH LINK RELATIVE ADDRESS |
| SBSDT3 | | | BACKWARD AGE LINK RELATIVE ADDRESS | | L F A L | FORWARD AGE LINK RELATIVE ADDRESS |
| SBSDT4 | 0 0 | | | | FILE NUMBER |
| | | | | | ENTRY N-1 |
| SBSDT(N×4) → | | | | | ENTRY N |

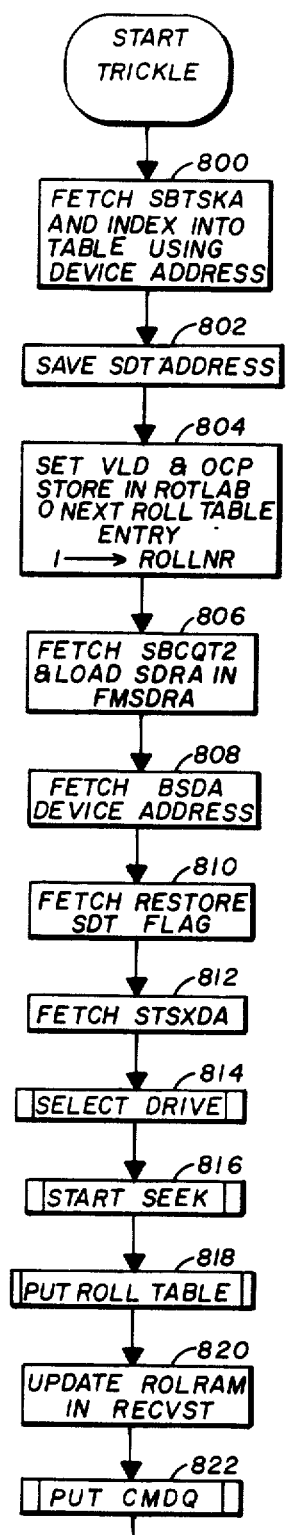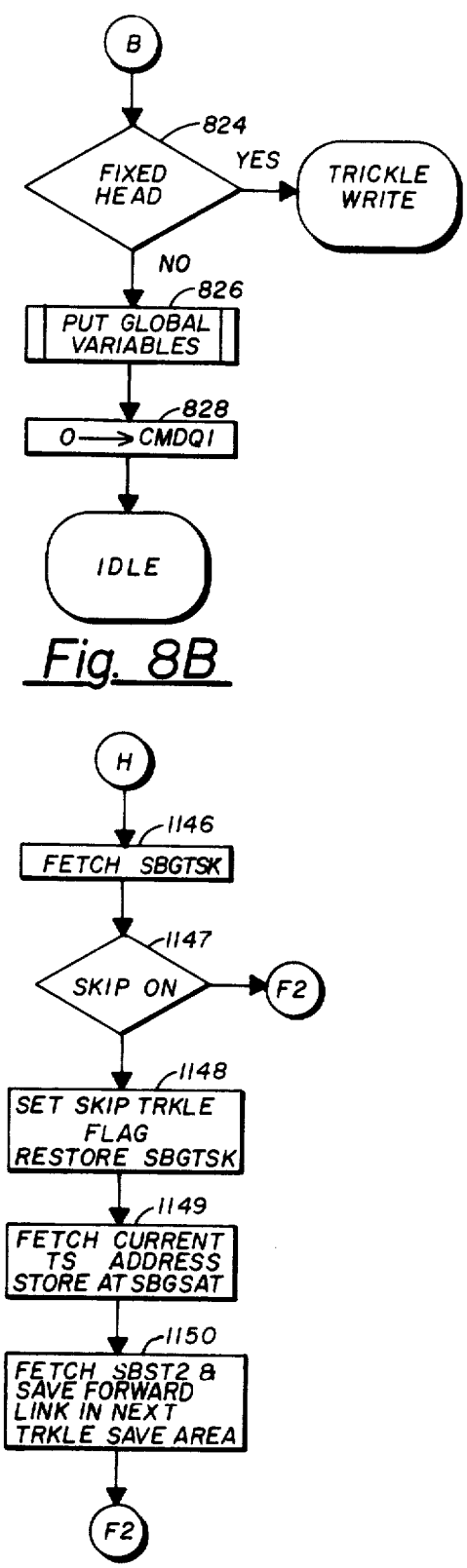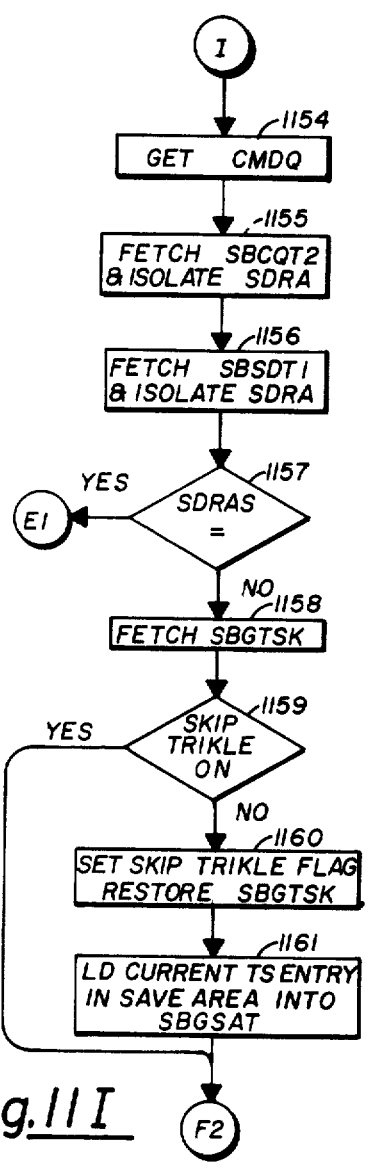
Fig. 8A   Fig. 8B   Fig. 11H   Fig. 11G   Fig. 11I

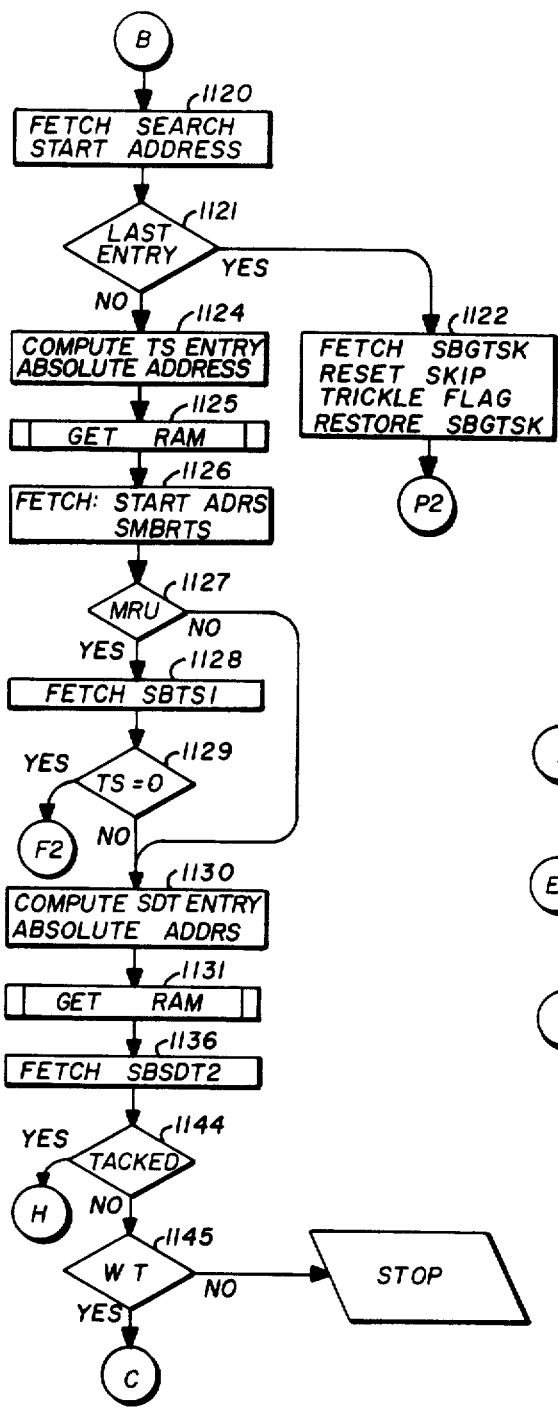
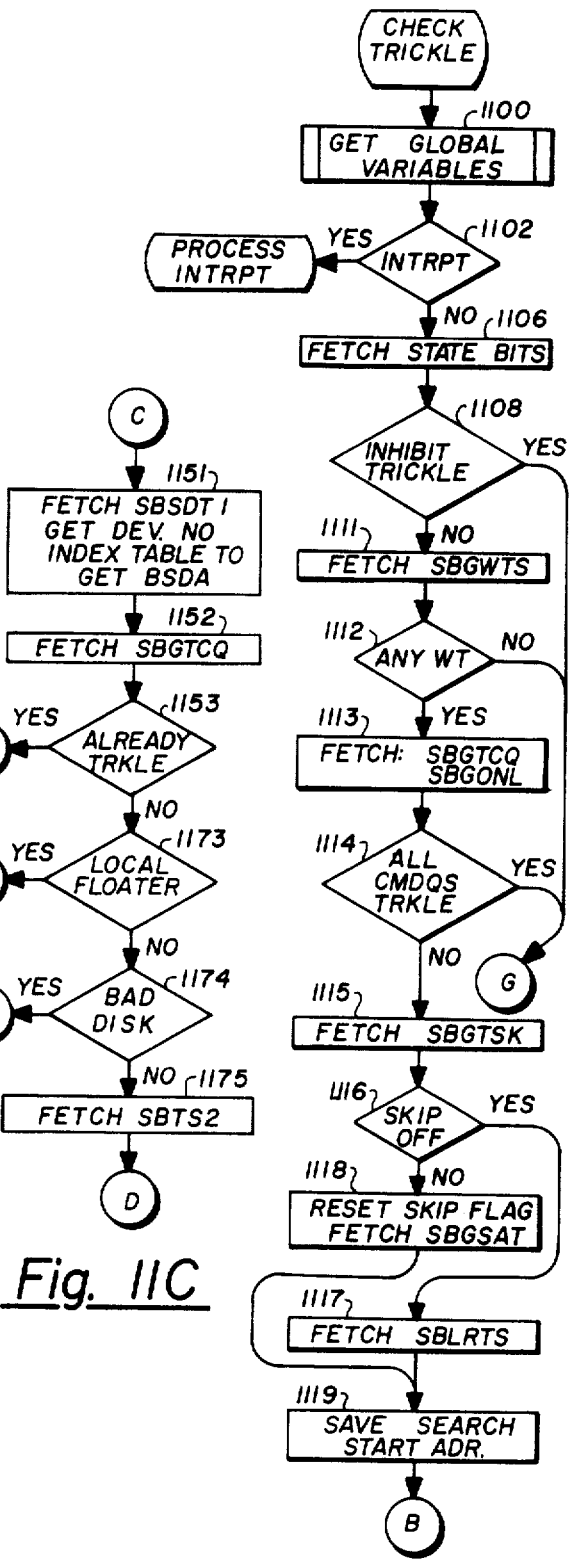
Fig. 11B
Fig. 11C
Fig. 11A

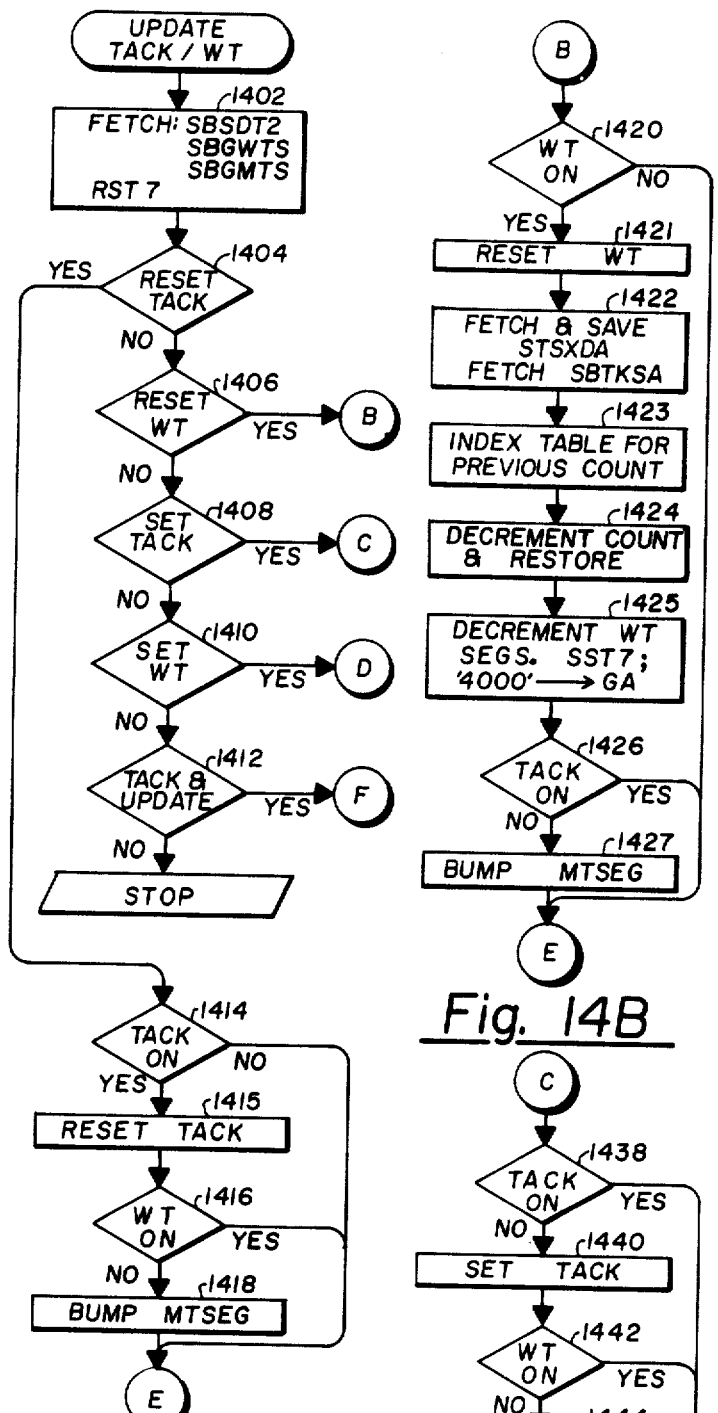
Fig. 14A
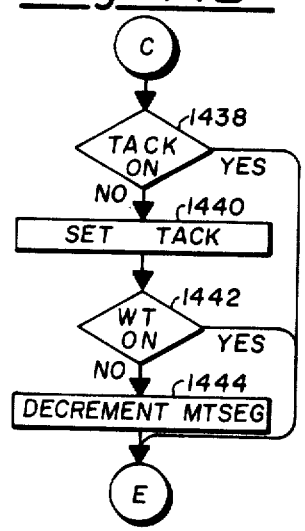
Fig. 14B
Fig. 14C
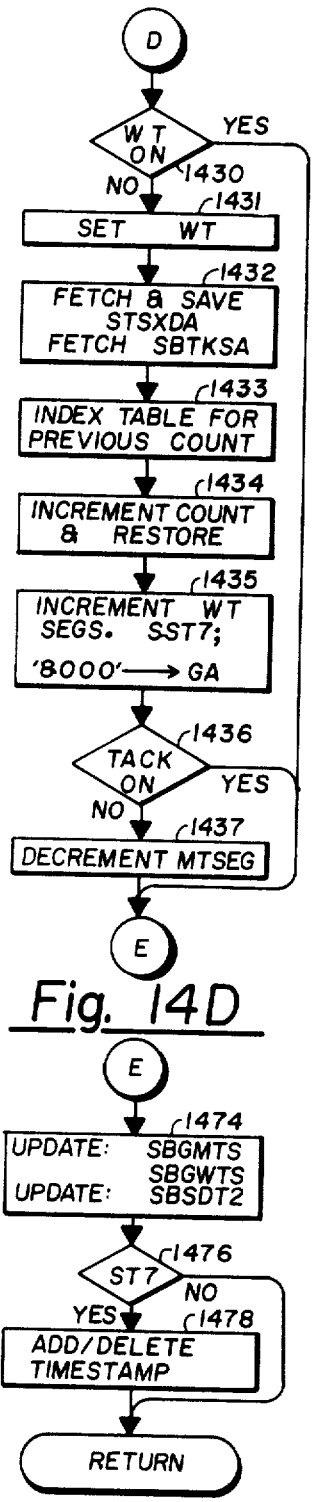
Fig. 14D
Fig. 14E

HIERARCHICAL MEMORY SYSTEM WITH VARIABLE REGULATION AND PRIORITY OF WRITEBACK FROM CACHE MEMORY TO BULK MEMORY

RELATED APPLICATIONS

This application is related to the copending applications of Robert E. Swenson, Ser. No. 207,097 entitled CACHE/DISK SUBSYSTEM TRICKLE now Pat. No. 4,394,732 and Ser. No. 207,152 entitled CACHE/DISK SUBSYSTEM now Pat. No. 4,394,733, both filed Nov. 14, 1980. This application also discloses subject matter disclosed and claimed in application Ser. No. 354,558 entitled CACHE/DISK SYSTEM WITH SEPARATE WRITEBACK AGING, application Ser. No. 354,556 entitled CACHE/DISK SYSTEM WITH WRITEBACK SYNCHRONIZATION, and application Ser. No. 354,327 entitled CACHE/DISK SYSTEM WITH WRITEBACK REGULATION RELATIVE TO USE OF CACHE MEMORY, filed concurrently herewith and incorporated by reference.

BACKGROUND OF THE INVENTION

The above-mentioned applications Ser. Nos. 207,097 and 207,152 disclose a cache/disk data processing system having means for decreasing the average time required to access data where that data is stored on disks. A cache memory is provided and data in this memory may be accessed in a much shorter time than if the data were accessed directly from the disks. The cache memory stores segments of data, these segments containing the most recently accessed words or the words most likely to be accessed within a short interval. When a host processor wishes to access a location or locations, it sends a command to a storage control unit which first checks to see if the data from the desired locations is resident in the cache memory. If it is, the data is returned to the host. If the data is not resident in the cache memory then it is staged by segments from a disk, placed in the cache memory, and sent to the host. This may require replacement of one or more of the segments in the cache memory with the new data. As taught by applications Ser. Nos. 207,097 and 207,152, this is accomplished by providing a segment descriptor table having an entry associated with each segment resident in the cache memory. Each entry in the segment descriptor table includes a forward and a backward age link address whereby the segments are linked from least recently used to the most recently used. When a segment must be replaced to make room for another segment, it is the least recently used segment which has not been written to since being moved from a disk to the cache memory that is replaced.

In the system described above a segment is relinked at the most recently used position each time it is referenced. During what would otherwise be idle time for the storage control unit, it trickles back to the disks segments in the cache memory which have been written to since they were first loaded in the cache memory from the disks. Segments are trickled back to the disks only if they have been written to and are then trickled back in order from the least recently used to the most recently used.

In the foregoing system a write operation is acknowledged to the host when data from the host is written into the cache memory. Between the time a write is acknowledged to the host and the time the data is actually written to the disk (by replacement or trickling) there is a window of vulnerability to any cache failure such as power loss which destroys the data. To shorten this window of vulnerability it is desirable to write all modified data to the disks as soon as possible. Unfortunately, this tends to significantly increase traffic within the subsystem to the extent that a considerable part of the advantages of a cache memory may be lost. The cache aging technique of least recently used, as employed in the aforementioned applications Ser. Nos. 207,097 and 207,152, minimizes the number of writebacks but still produces an arbitrarily long window of vulnerability for cache segments which are frequently referenced because the segments do not become candidates for trickling and once segments become candidates for trickling the trickle commands generated to control the trickling of the segments to the disks are assigned the lowest priority values. This problem was partially solved by the invention claimed in concurrently filed application Ser. No. 354,558 by separating the replacement age of a segment (i.e. its relative eligibility for replacement with a new segment) from its writeback age (i.e. its relative eligibility for being written back to disk). However, the mere separation of the replacement age of a segment from its writeback age did not completely solve the problem where the cache/disk system was extremely active. When the cache/disk system is extremely active there is insufficient "idle" time during which the written-to segments might be trickled back to the disks. Furthermore, a different problem exists in that higher disk write traffic occurs in the system when segments are trickled back to the disks too soon.

The present invention solves these problems by establishing a threshold writeback age such that written-to segments do not become candidates for trickling until the age since first write of the oldest written-to segment in the cache memory exceeds the threshold writeback age, and, once the age since first write exceeds the threshold writeback age, assigning the commands to trickle the segments an execution priority level which increases as the time of residence of the oldest written-to segment in the cache memory increases. Provision is made for bypassing the threshold age limitation such that all written-to segments may be trickle candidates if the subsystem is in an idle state but the priority assigned to the trickle commands for segments which are successful trickle candidates is still determined by the age since first write of the oldest written-to segment. As used herein the term "oldest written-to segment" refers not to total residence time in the cache memory but to the residence time since first being written to.

BRIEF SUMMARY OF THE INVENTION

An object of the present invention is to provide a method and apparatus for regulating the trickle of written-to segments from a cache memory to a bulk memory such that the segments which have been resident in the cache memory for the longest period of time are trickled first and segments are trickled only if the age since first write of the oldest written-to segment is equal to or greater than a predetermined threshold age.

An object of the present invention is to provide a method and apparatus for regulating the trickle of written-to segments from a cache memory to a bulk memory as described in the preceding paragraph wherein the priority of the trickle operation is determined by a comparison of the threshold age with the age since first write of the oldest written-to segment resident in the cache memory, the priority increasing as the age since first write of the oldest written-to segment increases in excess of the threshold age.

An object of the present invention is to provide an improved trickle means in a system having a host processor for issuing read and write commands, a bulk memory, a cache memory for storing segments of data most likely to be used in executing commands from the host processor, and a storage control unit for transferring segments of data between the bulk memory and the cache memory the improved trickle means comprising: first means responsive to a given write command from the host processor for assigning a timestamp value to a segment written to in the cache memory by the given write command when the given write command is the first command to write to the segment after it is transferred to the cache memory from the bulk memory, whereby each timestamp value indicates the age since first write of its associated segment; second means for storing a value representing a threshold age; and, third means responsive to the first means and the second means for trickling a given written-to segment from the cache memory to the bulk memory when the age since first write of the oldest written-to segment exceeds the threshold age.

A further object of the invention is to provide an improved trickle means as described above and further comprising: means for storing a table having an entry therein corresponding to each written-to segment in the cache memory; means for storing the timestamp value from a write command in the table if the write command is the first command to write to a given segment; and, means for linking the entries in the table in accordance with the sequence in which timestamp values are entered therein, the third means being responsive to the second means and the entries in the table for trickling written-to segments from the cache memory to the bulk memory on the basis of age since first write, the segment with the oldest age since first write being trickled first.

Another object of the present invention is to provide an improved trickle means as described above wherein the bulk memory comprises a plurality of disk drive devices and the system includes means for storing command queues, there being one command queue corresponding to each of the disk drive devices, the third means comprising trickle command generating means responsive to the second means and to the entries in the table for generating a trickle command for one segment when the age since first write of tne oldest written-to segment exceeds the threshold age value; and, means for adding the trickle command to the command queue corresponding to the disk drive device from whence the one segment came.

An object of the present invention is to provide an improved trickle means as described above wherein commands from the host processor may be added to the command queues, the commands from the host processor including a priority value indicating the relative priority of execution of the commands from the host processor the trickle means further comprising: means responsive to the second means and an entry in the table for inserting a low level priority value into the generated trickle command when the timestamp in the table entry corresponding to the one segment indicates that the age since first write of the oldest written-to segment equals said threshold age value; and, means for increasing the level of the inserted prioriry value as the age since first write of the oldest written-to segment becomes increasingly larger than the threshold age value.

A further object of the invention is to provide a method for trickling written-to segments resident in a cache memory back to the disk drive devices from whence they came in a system having a host processor for issuing read and write commands, a plurality of disk drive devices, a cache memory, and a storage control unit for controlling the transfer of segments of data between the disk drive devices and the cache memory, the method comprising: providing a timestamp in each write command from the host processor; storing, for each segment in the cache memory, the timestamp provided with the write command from the host processor which causes the segment to be first written-to after being transferred to the cache memory from one of the disk drive devices, to thereby establish an age since first write for each written-to segment in the cache memory; establishing a threshold age defining the age since first write at which segments become candidates for trickling; comparing the threshold age with the age since first write of the oldest written-to segment; and, trickling written-to segments from the cache memory to the disk drive devices only when the age since first write of the oldest written-to segment exceeds the threshold value.

Another object of the present invention is to provide a trickle control means wherein written-to segments are trickled back to the disks when the system has been idle for a predetermined interval of time regardless of the age since first write of the oldest written-to segment in the cache memory.

Other objects of the invention and its mode of operation will become apparent upon consideration of the following description and the accompanying drawings.

BRIEF DESCRIPTION OF THE DRAWINGS

FIG. 2 shows the format of a segment descriptor table entry;

FIG. 3 illustrates a command queue;

FIGS. 8A and 8B comprise a flow diagram illustrating the Start Trickle routine;

FIGS. 11A-11I comprise a flow diagram illustrating the Check Trickle subroutine;

FIGS. 14A-14F comprise a flow diagram illustrating the Update TACK/WT subroutine;

DETAILED DESCRIPTION OF THE INVENTION

Figure 1:
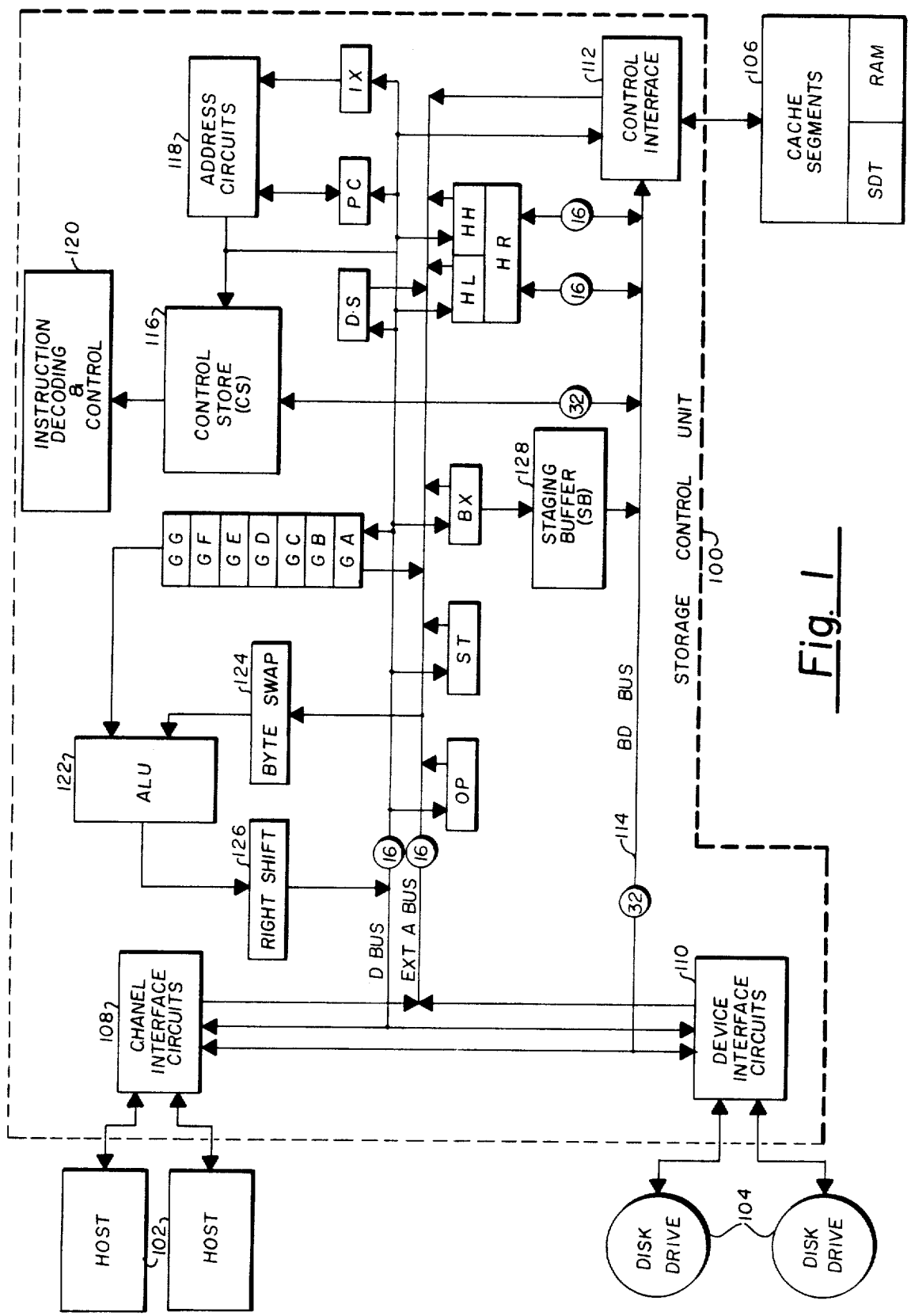
FIG. 1 is a block diagram of a cache/disk system.

FIG. 1 is a block diagram of a cache/disk system of the type described in U.S. patent application Ser. No. 207,152 filed Nov. 14, 1980. The system as illustrated in FIG. 1 includes a storage control unit 100 for interfacing a plurality of host processors or channels 102 with a cache memory 106 and a bulk memory illustrated as a plurality of disk drive devices 104. FIG. 1 is not intended to fully illustrate the cache/disk system but is provided so that the reader may more easily follow the programs subsequently described. It will be understood that a complete system may have an additional storage control unit serving additional host processors, with the storage control units having a full complement of registers as shown in application Ser. No. 207,152.

The storage control unit (SCU) 100 includes channel interface circuits 108, device interface circuits 110 and control interface circuits 112 for interfacing the SCU with the host processor (hosts), the disk drive devices and the cache memory, respectively. A BD Bus 114 is the primary data transfer bus used for transferring information between the hosts 102, the disk drive devices 104 and the cache memory 106 via the channel interface circuits 108, the device interface circuits 110 and the control interface circuits 112.

The SCU is provided with a control store (CS) 116 for storing the microprogram for the SCU as well as some of the variables and constants utilized as the program is executed. Control store 116 is addressed by addressing circuits 118 under the control of a program count register PC and an index register IX. In addition, a pushdown data stack DS is provided for saving the return addresses of calling routines during the execution of subroutines.

The addressing circuits 118 address the control store 116 to read instructions out to an instruction decoding and control circuit 120. The circuit 120 decodes the instructions it receives, selects the source or sources of data to be operated on, the destination of the result, controls branching operations and otherwise generally issues to the various elements of the storage control unit those signals necessary for executing a given instruction.

The SCU includes a plurality of addressable registers designated GA-GG, OP, ST, BX and HR all connected to a source bus designated the Extended A Bus and a destination bus designated the D Bus.

Register HR is a double-width register comprising two separately addressable single length registers HL and HH. HR is the primary working register for the SCU and any data fetched from control store 116 passes through HR. Data may of course be transferred from the control store 116 to other elements connected to the BD bus.

Registers GA-GG are general purpose registers which may serve as a source of information, a destination, or both. That is, a value in one of the registers GA-GG may be read out to an arithmetic logic unit (ALU) 122, modified therein by data applied to the ALU from the Extended A Bus through a byte swapper 124, an the result returned to the same register or a different register through a right shifter circuit 126 and the D Bus.

The byte swapper 124 is selectively controlled by the instruction decoder 120 to switch the two low order bytes of a word received from the Extended A Bus to the high order byte positions or vice versa. The right shift circuit 126 is also under control of the instruction decoder 120 and may pass data from the ALU to the D Bus without shift or with a shift of 1 bit to the right.

The OP register is a bit test register while the ST register is the status register.

The BX register is an addressing register used for addressing a staging buffer (SB) 128. The staging buffer 128 actually comprises two 8k staging buffers for holding segments of data as well as copies of certain variables read from the cache memory and utilized during various operations.

The cache memory 106 has one section for storing segments of data (1792 words per segment) and a random access memory (RAM) section for storing a segment descriptor table and various other global variables. The SDT and the global variables must be maintained in the memory 106 since the memory may be connected to another storage control unit like SCU 100, this additional storage control unit also interfacing further host processors and disk drive devices. The cache memory is constructed of MOSFET devices and is provided with a battery pack or uninterruptable power supply which will maintain the cache memory operative for some predetermined time, say fifteen minutes, in the event the AC power supply for the cache memory should fail.

The segment descriptor table (SDT) contains an entry for each segment of data resident in the cache memory 106. When a host 102 wishes to obtain data from one of the disk drives 104 it sends a command to the SCU 100. The SCU 100 brings the SDT from cache 106 to the staging buffer 128 and determines if the desired data is resident in the cache memory. If it is, the data is then sent to the requesting host 102 from the cache memory 106 under the control of the storage control unit 100.

If the requested data is not resident in cache then it must be obtained from one of the disk drive devices 104. The SCU 100 makes a determination of whether or not the disk drive device (hereinafter referred to as device) is on line and not busy. If the device is on line and not busy the SCU 100 controls the transfer of the segment or segments containing the desired data from the device to the cache memory 106 and sends the desired data to the requesting host 102.

If the device holding the desired data is busy, the SCU forms a command queue entry and enters it into a command queue in the staging buffer 128. There is one command queue for each device 104. The updated command queue is returned to the RAM portion of cache memory 106 and the host is informed that it must again address the data at a later time.

When the device 104 finishes the job it is working on it notifies the SCU and the SCU again brings the command queue from cache memory 106 to the staging buffer where it determines which command in the command queue for the device has the highest priority and controls the execution of this command. Eventually, the command which was stored in the command queue will be executed and the data staged from the device 104 to the cache memory 106. Later, when the host 102 reissues its command for the data the storage control unit determines that it is present in the cache memory and sends the data from the cache memory to the requesting host via the BD Bus and the channel interface circuits 108.

A similar procedure is employed if one of the hosts 102 wishes to write data to one of the devices 104. If the addresses to be written-to are included in the segments stored in cache 106 the data from the host is written to the cache memory and not to the device 104. An indicator is set in the SDT entry or entries corresponding to the segment or segments written-to and the segments are written from the cache memory to the device 104 at some later time more convenient for the SCU 100.

If the segment or segments to be written-to are not resident in the cache memory and the device is busy, the command is queued on the command queue for that device and executed at some later time determined by its priority in order to bring the desired segments from the disk drive device 104 to the cache 106. Later, after the queued command is executed and the disk drive device signals that it has completed a seek operation, the host 102 wishing to make the write operation again issues the write command and at this time the storage control unit brings the segment or segments into staging buffer 128, overlays them with the data from the host, and returns the modified segment or segments to the cache memory 106.

As explained in the aforementioned applications Ser. Nos. 207,097 and 207,152, when a new segment or segments has to be brought from a device 104 to the cache memory 106 and there are no empty segments in the cache memory 106 then some of the segments resident in the cache memory 106 must be deleted or removed therefrom in order to make room for the new segments. To accomplish this, each segment descriptor table entry is provided with a backward age link relative address and a forward age link relative address so that the segment descriptor table entries are linked from the least recently used (LRU) to the most recently used (MRU). The least recently used segment or segments are determined from the SDT. The new segment or segments are staged from devices 104 to the cache memory 106 to write over the LRU segments resident therein. This creates no problem where a segment being written over was not written to while resident in the cache memory since there is already a copy of the segment on one of the disks. However, where an LRU segment has been written to by a host processor while resident in the cache memory this segment must be destaged to one of the disk drive deivces 104 before its segment space in the cache memory may be written over by the new segment.

As further explained in the aforementioned applications, when the SCU 100 has no other work to do it may search the SDT to locate segments which have been written to and trickle these segments to the devices 104 thus making space available in cache 106 for additional segments. The trickling of written-to segments takes place on the same basis as segment replacement, that is, the least recently used segments are trickled first with the least recently used being determined from the forward and backward age links in each SDT entry. As will be evident from the following description, the present specification discloses an improved way to control this trickling operation.

FIG. 2 illustrates the segment descriptor table (SDT). Each SDT entry comprises four words. There is one entry in the SDT table for each segment resident in the cache memory 106. The SDT illustrated in FIG. 2 differs from the SDT illustrated in the foregoing applications in that each entry has four words rather than three words and the second word includes fields not shown in the prior applications. The GFTR and LFTR bit is set when the corresponding segment is a global or a local "floater" segment, i.e. one which cannot be written to a disk drive device because the device has a bad disk. However, these differences are not relevant to the present invention.

The mnemonics to the left of the word formats in FIG. 2 identify both the SDT word and its location in staging buffer 128 when the SDT is moved thereto. In SBSDT1 the host ID field identifies the host that last issued a command to the associated cache segment. The device number field identifies one of the disk devices 104 and the segment device relative address field is a number which represents the segment offset (relative number from the first segment) of data on a disk. In SBSDT2, bit 0 is the VALID DATA bit which indicates whether or not the segment in cache associated with this SDT entry contains valid data. The TACK bit indicates whether or not the associated cache segment space in cache memory 106 is reserved for data that will be transferred thereto either from the host or from a disk. Bit 2 of SBSDT2 is the "written-to" indicator which indicates whether or not the associated cache segment has been written to by the host and the written-to segment not yet destaged to the disk. The other fields of SBSDT2 are not relevant to the present invention.

In SBSDT3 bit 0 is the last backward age link (LBAL) bit and when set indicates that this SDT entry is the last in the backward age link. The backward age link relative address points to the next SDT entry with the backward age link relative addresses linking all of the segments from most recently used to the least recently used. Bit 16 is the last forward age link (LFAL) bit and when set indicates that this entry is the last entry in the forward age link. The forward age link relative address field is the relative address of the next entry in the forward age link. The forward age link relative address fields in all of the SDT entries link all of the segments from least recently used to most recently used. In a typical system, the cache memory 106 may be capable of storing 8k segments of data in which case there are 8k SDT entries each having four words as shown in FIG. 2.

FIG. 3 illustrates one command queue. There is one command queue for each of the devices 104. Each command queue includes two header words and up to seven entries with each entry having three words.

The first word of the command queue header (SBCMDQ when located in the staging buffer) includes fields DB, NCQ, device number and next sequence number. DB is an indicator bit which is set when the device associated with this command queue is busy. NCQ indicates the number of commands presently queued in this queue. The device number identifies the device 104 with which this command queue is associated. The next sequence number field contains the sequence number that is to be inserted in the next command entry made in the queue. This number starts at zero, is incremented until it reaches 255, and then wraps back around to zero.

The second word of the command queue header (SBCMQH) has an active command request number field which represents the request number of the command currently being executed. The seek in progress request number field is used in conjunction with the invalid entry (IV) bit. When IV=1 it indicates that no seek is in progress. When IV=0 the request number is the number of the command with a seek in progress. One command queue slot is reserved for each request number. Each slot stores a three word command queue entry. The first word of a command queue entry (SBCMQ1) has a host ID field identifying the host that issued the command, a full bit (FL) indicating whether or not the slot contains a command, a priority field which is used to determine the order of execution of the commands in the queue and a sequence number field indicating the relative sequence in which the command was received from the host. The priority and sequence number fields are used to determine the priority of execution of the commands in a queue. A priority value of 0 indicates the highest priority and the value 7 represents the lowest priority. The commands are executed on a first-in-first-out basis within a priority group, the sequence number fields indicating the relative sequence in which the commands were received from the host or hosts. The SCQ bit indicates that the command has been queued and was selected for execution by the Idle Loop (service command queue) routine. The allhits bit (AHT) indicates that all of the data necessary for execution of this command is resident in the cache memory. The trickle bit (TRK) identifies a command as a trickle command. The other fields of SBCMQ1 are not relevant to an understanding of the present invention.

The second word of a command queue entry (SBCQT2) has an NSEG field representing the number of segments to be transferred for this command and a segment device relative address field (SDRA). The SDRA field identifies the starting segment address of the first word of a transfer. This address is derived from the relative word address field provided in a command from the host.

The third word of a command queue entry (SBCFQ3) includes a user's file number field which is not utilized in the present invention.

In applications Ser. Nos. 207,097 and 207,152 mentioned above, a cache command issued by a host 102 comprises four words. In accordance with the principles of the present invention a host 102 issues a read or a write command which comprises five words. The fifth word is a 32-bit word comprising a timestamp indicating the time at which the command was issued. According to one aspect of the present disclosure, this timestamp is used to assign increasingly higher priority to queued trickle commands in the command queue to thereby reduce the time that a segment remains in cache after it has been written-to. In accordance with another aspect of this disclosure the timestamp for the oldest written-to segment (TOLDEST) is always saved at a specific location in the RAM. It is periodically sampled by a Read command from the host processor so that the host processor at all times has a fairly up-to-date indication of what segments in the cache memory have been written to but not destaged to the disks. If a failure should occur in the cache memory, the host processor may then determine from its last reading of TOLDEST exactly what procedures must be employed to recover from the failure.

As each command is received by the SCU from a host processor, its timestamp is stored in a location reserved for the current timestamp (TCURRENT), replacing any timestamp therein. In addition, a timestamp table is maintained, this table having an entry corresponding to each entry in the SDT. When a segment is first written-to the timestamp passed with the host write command is saved in the timestamp table. Subsequent writes to a written-to segment do not alter the timestamp in the table. When a segment is trickled its timestamp entry in the timestamp table is cleared. Thus, each written-to cache segment is timestamped with the time of the first write since it was last written to disk. As subsequently used herein, a written-to segment is, by definition, a segment that has been written-to by a host processor but has not been returned to its disk since the write operation took place.

Figure 4:
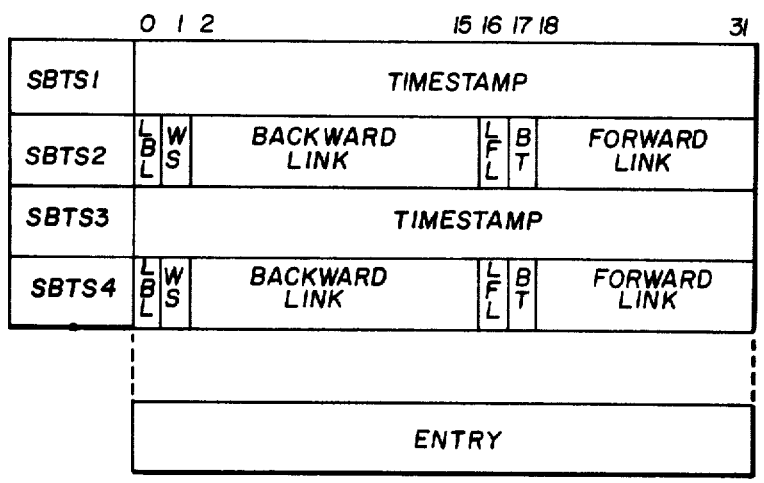
FIG. 4 illustrates the format of entries in a timestamp table.

FIG. 4 illustrates the timestamp table. The timestamp table has a slot corresponding to each segment in the cache memory. An entry is made in a slot the first time the segment is written to in response to a write command from the host processor. Each entry in this table comprises two words hence the details of two entries are shown in FIG. 4. The first word of each entry in the timestamp table is the timestamp. The timestamp is obtained from the write command issued by the host an is a value representing the instant in time at which the write command is issued. In a preferred embodiment a clock within the host processor generates the timestamp value. The entries in the timestamp table are linked in a FIFO list. Word 2 of each entry includes a backward link address and a forward link address for linking the entries from the oldest written-to to the newest written-to. Bit 0 is set if the entry is the last backward entry in the list (i.e oldest written-to) while bit 16 is set if the entry is the last forward (i.e. newest written-to) entry in the list. The WS and BT bits are not utilized in the present invention.

The timestamp table is normally stored in the RAM portion of cache memory 106 and selected entries from the table are brought to the staging buffer 128 for use. The entries which are brought to the staging buffer may be the current entry corresponding to the segment being written to or the entry being deleted because the corresponding segment has been replaced in the cache memory. The current entry or delete entry is stored in the staging buffer 128 at locations SBTS1 and SBTS2. In some cases it may also be necessary to bring the next entry or the previous entry (relative to the current or delete entry) into the staging buffer and if the previous entry or the current entry is brought to the staging buffer it is placed in locations SBTS3 and SBTS4.

It should be understood that the SDT of FIG. 2 and the command queues, one of which is illustrated in FIG. 3, are also normally stored in the RAM portion of cache memory 106 and are brought to the staging buffer 128 for use. The mnemonics given at the left of FIGS. 2 and 3 are those assigned when the associated words are resident in the staging buffer. From the staging buffer individual words may be fetched to the HR register for use or modification. Variables stored in the control store 116 may also be fetched to HR for use and modification. In the following program description where the term fetch is used and the variable fetched has a mnemonic beginning with SB as, for example SBCMDQ, it will be understood that the variable is fetched from the staging buffer. If the mnemonic does not begin with the letters SB then the fetching operation is from the control store 116.

IDLE LOOP

Figure 5:
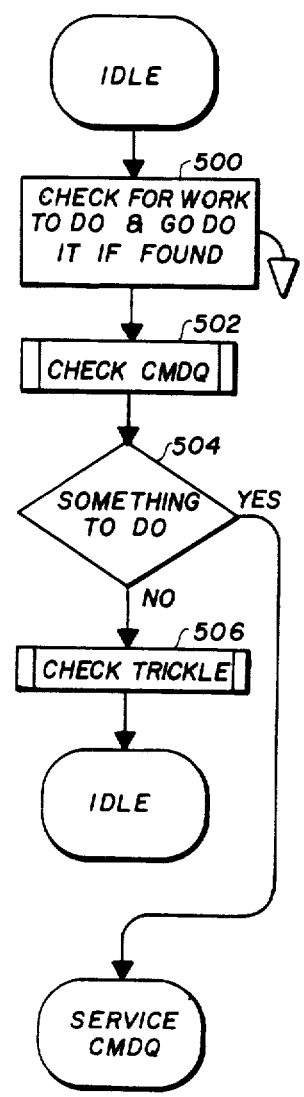
FIG. 5 is a flow diagram illustrating the Idle routine.

When the SCU 100 of FIG. 1 completes an operation it returns to an idle loop as illustrated in FIG. 5 where is looks for the next operation to be performed. As indicated generally at step 500, the SCU checks at the channel interface circuits 108 to see if a host is issuing a command and then checks at the device interface circuits 110 to see if one of the devices 104 has completed a seek operation and is ready to transfer data to the SCU. If any of these operations are to be performed a branch is taken from the idle loop at step 500 to perform the required operation. After the operation is completed the program returns to the start of the idle loop and again moves to step 500. If, at step 500 the program does not find that a host or a device wishes to communicate with the SCU, it proceeds to step 502 where a Check Command Queue subroutine (FIGS. 12A-12D) is called. As subsequently explained, the Check Command Queue subroutine sequentially reads the first word of each command queue header, starting at the next in priority, until it finds a non-busy device with a command queued against it. If the subroutine finds a command to be executed in one of the queues it returns to the idle loop with the value 8000 in GA and the command queue in the staging buffer. If there are no commands queued for an of the devices the Check Command Queue subroutine returns to the idle loop with the value 0 in GA. At step 504 GA is tested and if it contains the value 8000 the idle loop branches to the service command queue routine shown in FIG. 6. All 4-digit values used in this specification are hexadecimal values unless otherwise indicated.

If the test of GA at step 504 indicates that there are no queued commands then the program again checks the interfaces (steps not shown) to see if a host or a device wishes to communicate with the SCU. If they do then the idle loop branches t perform the required operation in the same manner as for step 500. If there is still no work to be done the idle loop proceeds to step 506 where it calls a Check Trickle subroutine. This subroutine, illustrated in FIGS. 11A-11I, searches for trickle candidates or segments which have been written to while residing in cache by following the timestamp links (FIG. 4) starting from the oldest such segment. If a trickle candidate is found, a trickle entry is built and entered in the command queue for the corresponding device and the command queue returned to the RAM. After this has been done the subroutine returns to the idle loop and, since this is the last operation performed in the idle loop a return is made to the beginning of the idle loop. More than one trickle command may be built during execution of the Check Trickle subroutine but only one trickle command is ever generated for any given command queue.

It should be noted that the Check Trickle subroutine merely places the generated trickle command, if any, in the command queue for the associated device 104. It does not execute the command. Eventually, when the idle loop is being executed it will, at step 502, find this trickle command in the command queue and then proceed to execute it at that time.

If the test of GA at step 504 indicates that the Check Command Queue subroutine found a queued command waiting to be executed, either a trickle command or a command entered in queue as a result of a read or write command from a host processor, the idle loop branches to the Service Command Queue routine.

SERVICE COMMAND QUEUE

Briefly, the Service Command Queue routine (FIG. 6) calls a Find Command Queue Entry subroutine to get the next command queue entry in priority from the command queue in the staging buffer. This command queue is the one left in the staging buffer by the Check Command Queue subroutine at step 502. The Find Command Queue Entry subroutine then selects the disk and transfers control to the Cache Breakout routine.

Figure 6:
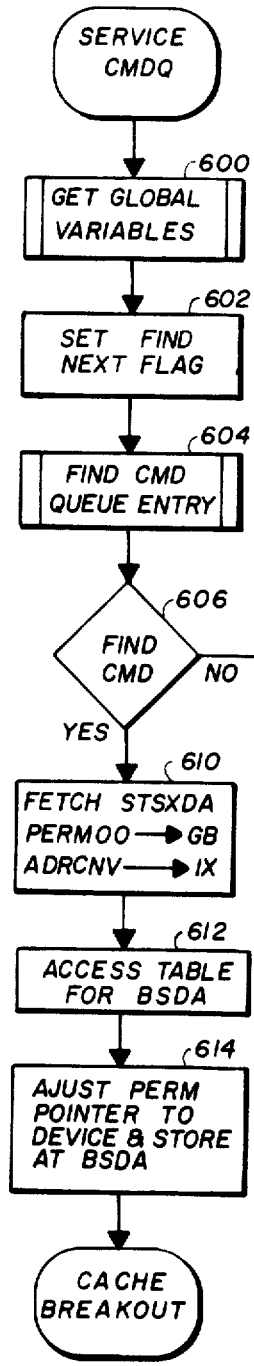
FIG. 6 is a flow diagram illustrating the Service Command Queue routine.

As illustrated in FIG. 6, the Service Command Queue routine begins by executing a Get Global Variables subroutine to bring the global variables from the RAM portion of the cache memory to the staging buffer. The global variables include such values as the addresses of the least recently used and most recently used segments, the addresses of the newest and oldest timestamp entries in the timestamp table, a mask word containing an indicator bit for each device indicated whether or not a trickle command is pending for the device, and many other variables as subsequently described.

Upon return from the Get Global Variables subroutine step 602 is executed to load a flag value into GA. This flag value is used to tell the Find Command Queue Entry subroutine about to be called that the subroutine is to find the next highest priority command in the command queue. The Find Command Queue Entry subroutine (FIGS. 13A-13B) is executed at step 604 and, as subsequently described, this subroutine returns to the calling routine with an indication in GA as to whether or not it found a command for execution. The value in GA is tested at step 606 and if a command was not found for execution the program proceeds to step 608 where a subroutine is executed to release the SDT. A return is then made to the idle loop.

If the test at step 606 indicates that the Find Command Queue Entry subroutine found a command for execution, the program proceeds to step 610 where the device address in STSXDA is fetched. This device address was placed in the control store 116 during execution of the Check Command Queue subroutine at step 502 and is the address of the non-busy device found to have the highest priority command queued against it. Next, PERM00, the base address of a permanent storage area for the devices, is fetched and loaded into GB. This permanent storage area includes for each device the physical identification of the logical device address, current seek address, and other information not relevant to the present invention. As a last operation in step 610, the base address (ADRCNV) of an address conversion table is entered into the IX register.

In step 612, the device address is added to ADRCNV to index into the table and obtain a bit significant device address, that is, an address having a single binary 1 bit therein, the location of the bit in the word designating the address of the device. The bit significant device address (BSDA) obtained from the table is used in step 614 to adjust the permanent pointer to the device and the result is stored at location BSDA in the control store. The Service Command Queue routine then proceeds to the Cache Breakout routine.

CACHE BREAKOUT

Figure 7:
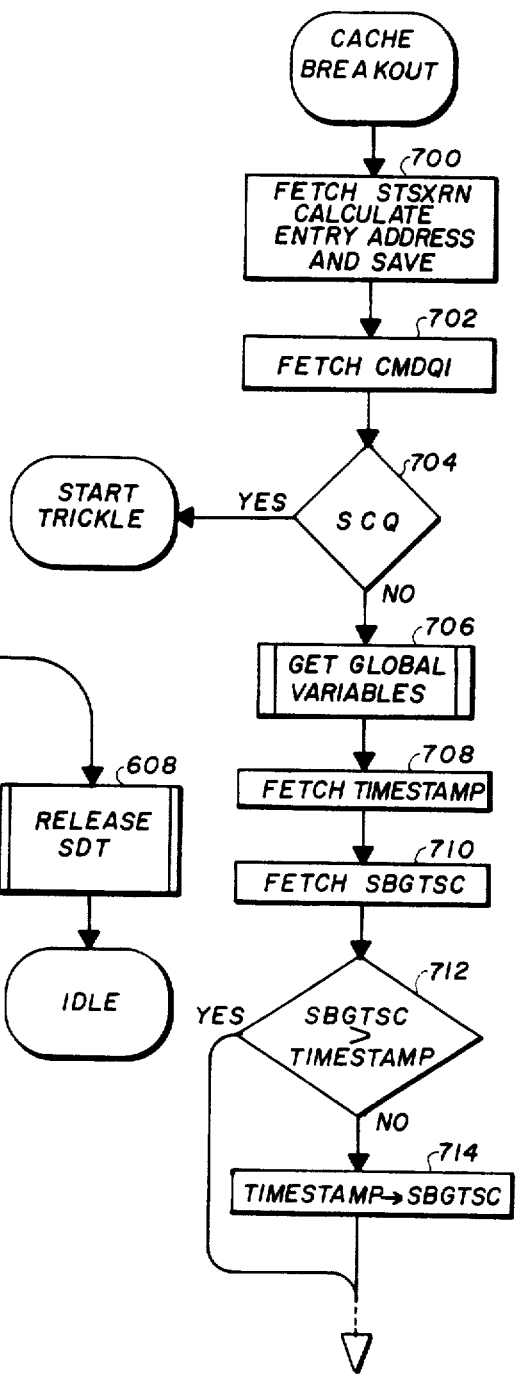
FIG. 7 is a diagram illustrating the Cache Breakout routine.

The Cache Breakout routine (FIG. 7) begins a step 700 by fetching the request number of the command which is stored in the control store at STSXRN. This request number was derived from word 1 of the command queue entry found at step 604. The request number is multiplied by three to obtain the offset into the command queue for the current entry. This value is then added to the base address of the command queue and the result saved. At step 702 CMDQ1 is fetched from the control store. CMDQ1 is a control store copy of the first word of a command queue entry and was placed in the control store during execution of the Find Command Queue Entry subroutine at step 604.

At step 704 the SCQ bit of CMDQ1 is tested to see if the command queue entry found at step 604 is a trickle command. If it is, then a branch is taken to the Start Trickle routine subsequently described.

If the Cache Breakout routine is entered from some routine other than the Service Command Queue routine or if the command queue entry found at step 604 is not a trickle command, the test at step 704 proves false. At step 706 the global variables are brought from cache to the staging buffer and at step 708 the channel command timestamp stored at CEF5 of the control store is fetched and saved at GA and GB. The current timestamp SBGTSC is fetched from the staging buffer and the channel command timestamp subtracted therefrom. If SBGTSC is greater than the timestamp stored at CEF5 this condition is detected at step 712 and step 714 is bypassed. On the other hand, if the channel command timestamp is greater than SBGTSC then the channel command timestamp becomes the current timestamp and is stored at SBGTSC.

After step 714 is executed the Cache Breakout routine analyzes the current command and determines what operations should be performed to carry out the command. After these operations are completed the program returns again to the beginning of the idle loop in FIG. 5. The operations subsequent to step 714 are not relevant to the present invention.

If the test of SCQ at step 704 shows that this bit is set, it means that this command was entered into the command queue as a result of the Check Trickle subroutine step 506) having found a segment to trickle. In this case a branch is taken at step 704 to the Start Trickle routine.

START TRICKLE

The Start Trickle routine (FIGS. 8A and 8B) is executed only when the Cache Breakout routine finds that a trickle command is the highest priority command in the command queue. It builds a roll table entry for the operation, selects the disk drive, and starts a seek operation. For a fixed head disk drive device an exit is taken to the Trickle Write routine to accomplish the actual trickling of one segment of data from the cache memory 106 to the specified device 104. If the trickle command is for a movable head disk drive device then the global variables are returned to cache memory 106, CMDQ1 cleared in the control store, and a return made to the idle loop to look for more work to be done while the movable head device is accomplishing the seek operation.

The Start Trickle routine begins at step 800 by fetching the device address STSXDA and the base address SBTSKA of a table of trickle candidates. This table has an entry for each device, the entry containing the SDT address of the segment waiting to be trickled out for that particular device. The entries are made in the table during execution of the Check Trickle subroutine at step 506.

The device address is added to the table base address and the table accessed at step 802 to obtain the SDT address of the SDT entry associated with the segment to be trickled. This SDT address is fetched to the HR register and also saved at some convenient location in the control store 116.

Figure 9:
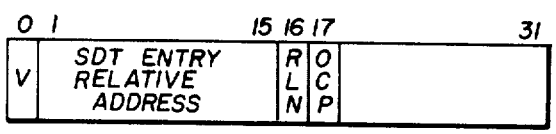
FIG. 9 illustrates the format of a roll table entry.

At step 804 a roll table entry like that shown in FIG. 9 is built using the SDT address obtained from the table. The VALID and OCCUPIED bits are set and the roll table entry thus formed is stored in control store 116 at ROLTAB, the base address of the roll table. The next entry in the roll table is cleared to indicate the end of the table and the value 1 is set into ROLLNR in the control store 116 to indicate that only one segment is to be rolled out from the cache to the device 104. The use of ROLLNR and a roll table entry to control the transfer of one or more segments from the cache memory to a disk device is explained in applications Ser. Nos. 207,097 and 207,152 and does not, per se, constitute part of the present invention.

At step 806 the second word of the command queue entry is fetched in order to obtain the segment device relative address which is then stored in the control store at FMSDRA.

The BSDA stored in the control store at step 14 is fetched at step 808 and ORed with an SDT restore flag byte. This provides an indication to a recovery module that the roll table has been built and an SDT entry altered. The result is returned to the staging buffer at the location reserved for the SDT restore flag byte SBRSDT.

At this point the storage control unit is ready to begin the transfer operation. At step 812 the device address is fetched from STSXDA and a call made to a subroutine at 814 to select the drive indicated by the device address. Next, a call is made to a Start Seek subroutine 816 to initiate a seek operation for the selected device. At 818 a subroutine is called to put the roll table in the staging buffer back into the RAM portion of cache memory 106. At step 820 a recovery status word RECVST is fetched from the control store and updated to indicate that the roll table has been returned to the RAM. At step 822 a subroutine is called to put the command queue in the staging buffer back in the RAM.

The next operation is determined by bit 5 of the ST register. If bit 5 is set it means that the disk drive device is a fixed head device. In this case, there is no need to wait for the device to seek the desired location for the data transfer. Therefore, if the test at step 824 proves true the program branches to the Trickle Write routine.

If the test at step 824 indicates that the device is of the type having movable heads, the SCU proceeds to do other work while the head is being positioned. At step 826 the global variables in the staging buffer are returned to the RAM portion of the cache memory 106 and at step 828 the copy of the first word of the command queue entry in the control store (CMDQ1) is cleared. The program then returns to the idle loop of FIG. 5 to look for more work to do. Eventually, the disk device will locate the desired data and send an interrupt to the SCU. The interrupt processing module (not shown) will determine that the interrupt is for execution of a trickle command and will branch to the Trickle Write routine after placing the appropriate command queue in the staging buffer and the device number in STSXDA.

TRICKLE WRITE

Figure 10A:
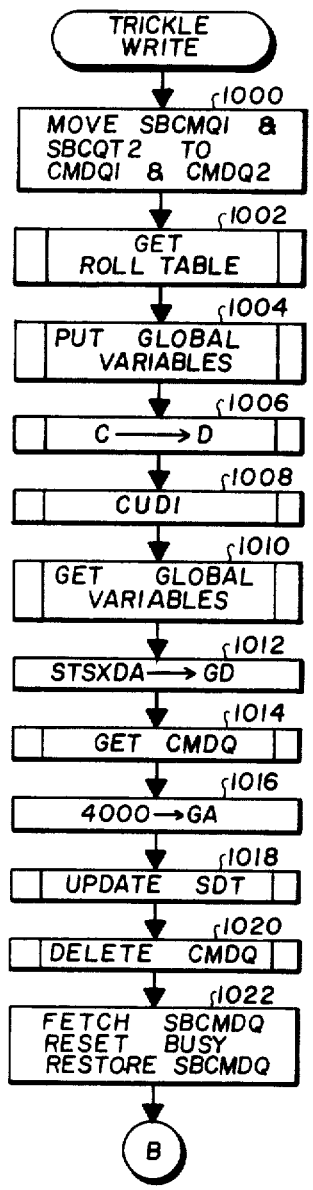
FIGS. 10A and 10B comprise a flow diagram illustrating the T Write routine.
Figure 10B:
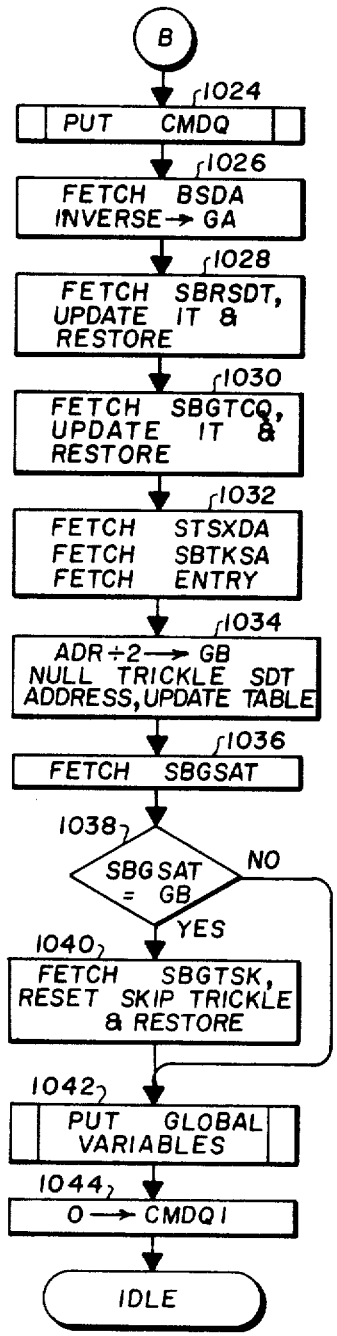

As illustrated in FIGS. 10A and 10B, the Trickle Write routine begins by fetching the first two words of the command queue entry from the staging buffer and storing them in the control store at CMDQ1 and CMDQ2. The EF2 bit in the first word is set before the word is stored in CMDQ1. At step 1002 a subroutine is called to bring the roll table from the RAM to the staging buffer. Next, a subroutine is called to put the global variables in the staging buffer back into the RAM.

The storage control unit is now ready to trickle one segment of data from the cache to the selected disk device. A Cache-to-Disk subroutine is called at step 1006 to accomplish the actual transfer. After the transfer is completed, a Control Unit Device Interface (CUDI) subroutine is called at step 1008 to release the disk drive device whic received the segment of data. At step 1010 the global variables are again brought from the RAM to the staging buffer. At step 1012 the number of the device involved in the transfer is fetched from the control store and entered in GD. A subroutine is then called to get the command queue in the RAM and bring it into the staging buffer. At step 1016 the value 4000 is entered into GA as an input parameter for a subroutine which updates the SDT. The update SDT subroutine 1018 is then executed and because of the value in GA this subroutine will reset the WT bit in word 2 of the SDT entry associated with the segment just transferred. The timestamp entry will be deleted when WT is cleared.

A Delete Command Queue subroutine is called at step 1020 to delete from the command queue the trickle command which has just been executed. The first header word of the command queue is fetched at step 1022 and the Device Busy bit reset. The header word is then returned to its location in the staging buffer.

Next, a Put Command Queue subroutine is called to put the command queue in the staging buffer back in the RAM. At step 1026 the binary significant device address is fetched, inverted, and stored in GA.

SBRSDT is a word containing a flag for each device indicating whether or not the SDT should be restored. At step 1028 SBRSDT is ANDed with the value in GA and the result returned to the staging buffer at the location reserved for SBRSDT.

SBGTCQ is a binary significant device address mask of the command queues with trickle commands pending. At step 1030 it is fetched from the staging buffer, ANDed with GA to reset the flag for the device just used in the trickle operation, and the updated word is returned to the staging buffer.

Next, the Skip Trickle flag should be reset if SBGSAT points to the entry just trickled. At step 1032 the device address (STSXDA) and the base address (SBTKSA) of the table of SDT addresses for segments waiting to be trickled are both fetched and the table is accessed for the entry corresponding to the device just used in the trickle operation. The address thus obtained from the table is right-shifted to obtain the corresponding timestamp table entry address and this is saved at GB. The trickle SDT address from the table is then nulled (set to all ones) and the result returned to the table.

At step 1036 the SDT address used for the trickle operation (SBGSAT) is fetched and compared with the timestamp table entry address in GB. If they are not equal the program proceeds from step 1038 directly to step 1042. If they are equal, SBGTSK, the relative SDT address of the first written-to segment skipped by the Check Trickle subroutine because a trickle command could not be built for it, is fetched, reset, and then restored to the staging buffer. The program then proceeds to step 1042 where a subroutine is called to put the global variables back in the RAM. CMDQ1 is then cleared before the Trickle Write routine branches to the idle loop.

CHECK TRICKLE

The Check Trickle subroutine searches for candidates for trickling, that is segments which have been written-to while residing in cache. These segments are identified by having the WT bit set in the second word of the corresponding SDT entry. The search is made by following the timestamp link starting from the oldest segment in the link. When a trickle candidate is found, a trickle command is built in the command queue for the corresponding device. The subroutine may build more than one trickle command each time it is called but it will not build a trickle command for any command queue which already has a trickle command pending in it.

The subroutine continues until one of the following conditions occurs:

(1) All on-line devices have a trickle command in their command queue.

(2) A device or a host provides an indication to the SCU that it needs servicing.

In searching for trickle candidates, the SDT entries having the TACK bit set in word 2 are bypassed as candidates for trickling even though the WT bit may be set. Also, any SDT entry for a device which already has a trickle command in its command queue is not considered a candidate for trickling. In all of the above cases the next trickle start address global area (SBGSAT) is updated so that when Check Trickle is invoked the next time the search will start from this point.

After the Check Trickle subroutine is started, if it is found that the inhibit trickle flag is on in the subsystem state bits SBGSTA, or all online devices have a Trickle command pending, or the number of written-to segments in cache is zero, the Check Trickle subroutine is terminated.

As illustrated in FIG. 11A, the Check Trickle subroutine begins at step 1100 by bringing the global variables from the RAM to the staging buffer. A check is then made to see if there are any device interrupts and if there are the subroutine exits to process the interrupt. If there are no interrupts pending then at step 1106 the subsystem state bits are checked to see if the inhibit trickle bit is set. If it is, the subroutine branches to FIG. 11G where the RAM status word RAMST is fetched from the control store, updated to indicate that the global variables are in RAM, and restored at RAMST in the control store. At step 1110 a subroutine is called to release the SDT/cache. When this subroutine is completed the check trickle subroutine returns to the idle loop of FIG. 5.

Returning to FIG. 11A, if the test at step 1108 indicates that the inhibit trickle bit is not set the program proceeds to step 1111 where it fetches SBGWTS from the staging buffer. This word indicates the number of written-to segments in cache. It is tested at step 1112 and if there are no written-to segments in cache the program proceeds to FIG. 11G and then returns to the idle loop as previously described.

If the test at step 1112 indicates that there is at least one written-to segment in cache the program proceeds to step 1113 where it fetches SBGTCQ. This word contains a bit for each device and the bit is set if the command queue for the corresponding device has a trickle command pending. SBGONL is then fetched. This word contains a bit for each device and a bit is set if the corresponding device is on-line. At step 1114 SBGONL is compared with SBGTCQ to see if all command queues have at least one trickle command pending. If they do, a branch is taken to FIG. 11G and then a return made to the idle loop as previously explained.

If the test at step 1114 indicates that there is at least one on-line device which does not have a trickle command pending in its command queue, the program proceeds to step 1115 where SBGTSK is fetched. This word is the relative SDT address of the first written-to segment previously skipped during a prior execution of the Check Trickle subroutine because the device was busy or could not be serviced. At step 1116 SBGTSK is ANDed with the value 8000 to see if the skipped flag in the high order position of SBGTSK is set. If the skipped flag is off, the search is started from the oldest timestamp entry. A branch is taken to step 1117 where SBLRTS is fetched from the staging buffer. If the skipped flag is not off at step 1116 then the search is started from SBGSAT. This is the SDT address used for trickling. At step 1118 the skipped flag is reset and SBGSAT is fetched from the staging buffer.

At step 1119 either SBGSAT from step 1118 or SBLRTS from step 1117 is saved in the control store as the trickle search start address.

In FIG. 11B, the trickle search start address is fetched and ANDed with the value 8000 at step 1121 to see if the last forward link or entry in the timestamp table (FIG. 4) has been reached. If LFL is set then the newest entry link in the timestamp table has been reached and no further searching is required. A branch is taken to step 1122 where the skip trickle flag in SBGTSK is reset. The program then branches to FIG. 11F where a subroutine is executed to put the global variables in the staging buffer back into the RAM. A return is then made to the idle loop.

Returning to FIG. 11B, if the test at step 1121 indicates that the last forward link has not been reached the starting address fetched at step 1120 is masked to obtain the forward link address which is then stored in GE as the relative timestamp address. The base address of the timestamp table in the staging buffer is loaded into GB and a transfer length of 2 is loaded into GC. The base address of the timestamp table in the RAM is fetched from the control store and the relative timestamp address added to it. The result is entered into GE for use as the starting address in an operation to transfer two words of the timestamp table from the RAM to the staging buffer. At step 1125 the GET RAM subroutine is called to transfer two words comprising the timestamp entry from the RAM to the staging buffer.

At step 1126 the starting address saved at step 1119 is again fetched and the two high order bits removed to obtain the relative timestamp address. The address of the newest timestamp entry (SBMRTS) is fetched from the staging buffer and at step 1127 SBMRTS is compared with the relative timestamp address to see if the newest entry has been reached. If it has, the program proceeds to step 1128 where SBTS1 is fetched and checked (step 1129) to see if it is a zero value. If it is, the newest entry has already been trickled. The program branches to FIG. 11F where a subroutine is executed to put the global variables back in the RAM. A return is then made to the idle loop.

If the test at step 1127 indicates that the newest entry in the timestamp table has not been reached, or if at step 1129 the test indicates that the segment corresponding to the newest entry in the timestamp table has not been trickled, the program proceeds to step 1130 where it computes and saves the relative SDT address. Since there are two words per entry in the timestamp table and four words per entry in the SDT table the relative SDT address is obtained by multiplying the relative timestamp entry address by 2. This relative address is then added to the base address of the SDT to obtain the absolute address of the corresponding SDT entry in the staging buffer. The value 4 is entered into GC to specify a transfer length and the base address of the SDT in the RAM is fetched from the control store and loaded into GE. At step 1131 the GET RAM subroutine is executed to transfer the four word SDT entry from the RAM to the staging buffer.

Next, at step 1136 word 2 of the SDT entry is fetched. At steps 1144 and 1145 word 2 of the SDT entry is tested to see if the TACK bit or the written-to bit is set. If neither bit is set, an error condition exists and the SCU stops. If the TACK bit is set the program branches from step 1144 to FIG. 11H to test the skip trickle flag and update the next trickle start address. At step 1146 the skip trickle flag is fetched and at step 1147 the flag is tested. If it is on a branch is made to FIG. 11F where the global variables are returned to the RAM before a return is made to the idle loop.

If the skip trickle flag is not on at step 1147 then at step 1148 the flag is turned on and restored in the staging buffer. At step 1149 the timestamp entry forward link is fetched from SBTS2 and stored at SBGSAT, the address used for trickle. The forward link is also saved in the next trickle save area in the control store. At this time the program returns to FIG. 11F where the global variables are sent from the staging buffer to the RAM storage and a return is made to the idle loop.

Returning to FIG. 11B, if the test at steps 1144 and 1145 show that the SDT entry is not tacked and the written-to bit is set the program proceeds to step 1151 (FIG. 11C) where the first word of the SDT entry is fetched from the staging buffer and saved in the control store. Also, the device number from the SDT entry is added to ADRCNV, the starting address of the address convert table. The table is indexed to fetch from the control store the bit significant device address.

At step 1152 SBGTCQ, the word having one bit set for each device having a trickle command queued in its command queue, is fetched from the staging buffer. At step 1153 SBGTCQ is ANDed with the bit significant device address to see if there is already a trickle command queued for this device. The test is made at step 1153 and if there is already a trickle command queued for this device the program branches to FIG. 11I where, at step 1154, a subroutine is executed to fetch the command queue from the RAM to the staging buffer. Next, a test is made to see if the SDRA of the trickle command pending in the queue matches the SDRA from the SDT entry. At step 1155 the second word of the command queue entry is fetched and the SDRA isolated. At step 1156 the first word of the corresponding SDT entry is fetched and the SDRA in this word is isolated. At step 1157 the two SDRA's are compared. If there is no match, SBGTSK is fetched and the high order bit tested to see if the skip trickle flag is on. If it is, the program proceeds to FIG. 11F. If the skip trickle flag is not on, then at step 1160 it is set and SBGTSK returned to the staging buffer. At step 1161 the current TS entry in the save area is loaded into the start trickle address SBGSAT after which the program proceeds to FIG. 11F. Whether the skip trickle flag is on or off, in FIG. 11F the global variables are returned to the RAM after which the subroutine returns to the idle loop.

Figure 11D:
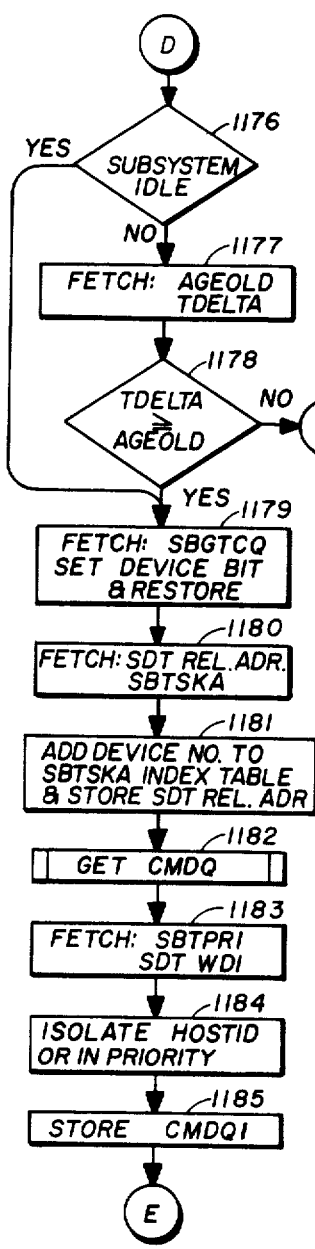
Figure 11E:
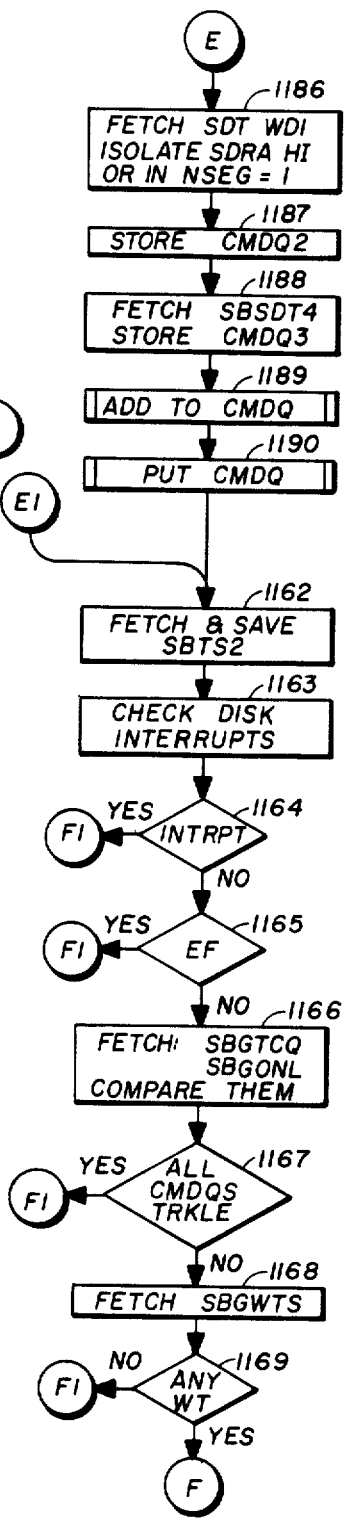

At step 1157, if the two SDRA's are equal, the subroutine branches to FIG. 11E where, at step 1162, the second word of the timestamp entry is fetched and the forward link saved in the control store to be used as the next trickle search address. At this point the routine checks to see if there is any more important work to be done by the SCU. At step 1161 a Check Disk Interrupts subroutine is performed to find out if there are any disk interrupts. The return code for the disk interrupt subroutine is checked at step 1164 and at step 1165 an instruction is executed to see if there is an EF (command from host) pending. If there is no interrupt or EF pending, then at step 1166 SBGTCQ and SBGONL are fetched and compared. At step 1167 the result is tested to see if all command queues have a trickle command pending. If there is at least one command queue that does not have a trickle command pending, then at step 1168 SBGWTS is fetched and at step 1169 a test is made to see if there are any written-to segments still present in the cache memory. If there are, the program proceeds to FIG. 11F, step 1170, where the newest timestamp entry is fetched and saved. At step 1171 the trickle search argument is fetched from the control store, the LFL bit masked off, and the trickle search argument compared with the newest timestamp entry. At step 1172 the result of the comparison is tested and if the two values are equal the last entry in the timestamp table has been checked. The program proceeds to step 1139 where the skip trickle flag SBGTSK is fetched. At step 1140 it is tested to see if it is on. If it is, the program moves to step 1123, puts the global variables back in RAM, and returns to the idle loop. If the skip flag is not on, the program proceeds from step 1140 to step 1141 where the skip flag is set and SBGTSK returned to the staging buffer. At step 1142 the second word of the timestamp entry is fetched and the forward link address saved at a convenient location in the control store. At step 1143 the forward link address is stored in the staging buffer at SBGSAT. The subroutine is then called to put the global variables back in the RAM and after this is accomplished a return is made to the idle loop.

If the test at step 1172 indicates that the last entry has not been checked then the program branches back to step 1120 in FIG. 11B to check the next entry.

Figure 11F:
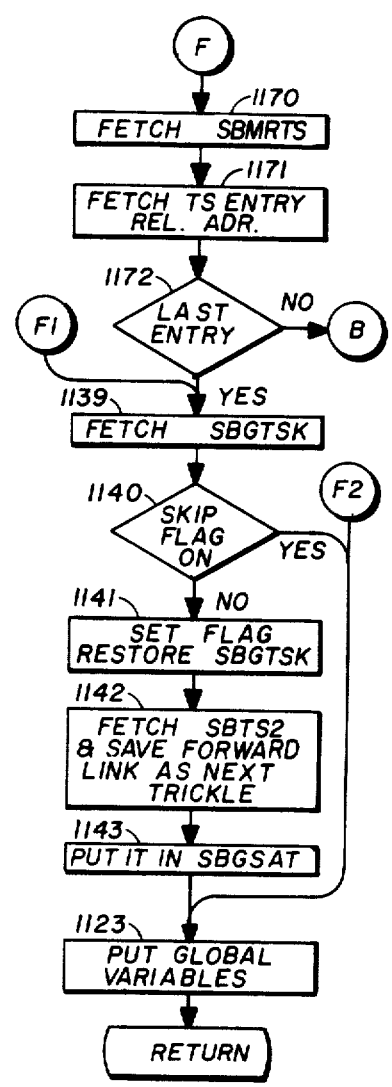

If the test at step 1164 indicates that an interrupt is pending, the test at step 1165 indicates an EF is pending, the test at step 1167 indicates that all command queues have a trickle command pending, or the test at step 1169 indicates that there are no written-to segments in the cache memory, the program branches to step 1139 of FIG. 11F and proceeds as previously described.

Returning to FIG. 11C, if the test at step 1153 indicates that there is not already a trickle command queued for this device the program proceeds to step 1173 where SBSDT2 is fetched and the local floater bit checked to see if it is set. If it is, this entry must be bypassed because the device to which the segment should be trickled is not operative. The program branches to step 1162 in FIG. 11E and proceeds as previously described. If the test at step 1173 shows that the local floater bit is not set in the SDT entry the program proceeds to step 1174 where it tests to see if the bad disk bit in word 2 of the SDT entry is set for the SCU making the trickle check. If the bad disk bit is set the trickle must be bypassed and the program branches from step 1174 to FIG. 11I where it proceeds as previously described.

If the bad disc bit is not set then at step 1175 word 2 of the entry in the timestamp table is fetched and at step 1176 (FIG. 11D) a test is made to see if the storage control unit or subsystem is in the idle state. If it is the program proceeds immediately to step 1179. If the subsystem is not in its idle state then the AGEOLD value stored at SBGAGE and the TDELTA value stored at SBGTLD are fetched.

AGEOLD is a system parameter which may be loaded into the system during parameterization. It represents an interval of time elapsing after a segment is first written to by a host processor after which the segment becomes a candidate for trickling. Stated differently, segments having an age since first write less than AGEOLD are not trickled. The exception to this occurs if the storage control unit is in the idle state, that is, it has no other work to do. In this case a segment may be trickled even though the age since first write is not as great as AGEOLD. TDELTA is a value representing the difference between the current timestamp value and the oldest timestamp value of all the entries in the timestamp table.

Generally speaking, it is desirable not to trickle written-to segments from the cache memory to the disk drive devices when there is other work to be done. Trickling during periods when there is other work to be done degrades system performance. On the other hand, it is desirable not to retain a written-to segment in the cache memory for too long a period after it is first written to since, in the event of a cache failure, the procedure for recovering lost data can become more time-consuming. Steps 1176–1178 comprise a means for balancing these two desires. If the subsystem is not idle and the age-since-first-write of the oldest written-to segment (TDELTA) is not equal to or greater than AGEOLD, the program does not check for trickle candidates but branches from step 1178 to FIG. 11H and proceeds as previously described. When the subsystem is idle, (i.e. no activity over the host-SCU interface for a given interval of say 200 ms) this is detected at step 1176 and the program proceeds to step 1179 to begin checking for trickle candidates. If the system is not idle then a check is made at step 1178 to see if the oldest written-to segment has been in cache memory for an interval of time equal to or greater than AGEOLD. If it has then the program proceeds to step 1179 to check for trickle candidates.

Assume now that the test at step 1176 proves true, or the test at step 1176 proves false but the test at step 1178 proves true. The program moves to step 1179 where SBGTCQ is fetched, the bit corresponding to this command queue is set, and the updated word returned to the staging buffer. At step 1180 the SDT relative address for the entry is fetched from the save area of the control store and the base address SBTSKA of the table of SDT addresses for segments on queue for trickling is fetched from the staging buffer. The device number saved at step 1151 is added to SBTSKA to index the table and obtain the entry. The SDT relative address is entered and the entry returned to its slot in SBTSKA.

The subroutine is now ready to build a trickle command and insert it in the command queue. At step 1182 a subroutine is executed to bring the command queue from the RAM to the staging buffer. The trickle execution priority (SBTPRI) is fetched from the staging buffer. The trickle priority is computed by the Determine Trickle Priority subroutine of FIGS. 16A and 16B and inserted in SBTPRI at step 1642. The first word of the SDT entry is fetched from the control store save area where it was saved at step 1151. At step 1184 the host ID is isolated and the trickle priority is OR'd in. The trickle bit is set and the resulting word is stored in the control store at CMDQ1.

At step 1186 the first word of the SDT entry is again fetched from the save area. The four high order SDRA bits are isolated and a value of 1 is entered into the NSEG field. This word is then stored in the control store at CMDQ2.

The formation of the third word of the command queue entry is illustrated at step 1188 and merely involves fetching the fourth word of the SDT entry and storing it at location CMDQ3 in the control store.

The three words comprising the trickle command are now present in the control store and at step 1189 a subroutine is called to add the trickle command to the command queue. After the trickle command is added to the command queue a subroutine is called to put the command queue back in RAM. This completes the generation and insertion of one trickle command in one command queue. The program then moves to step 1162 and proceeds as previously described.

It should be noted that the sequence of steps beginning at step 1120 (FIG. 11B) and proceeding in sequence through FIGS. 11B, 11C, 11D and 11E to step 1172 form a closed loop. The loop may be repeated up to 16 times if there are 16 devices and thus 16 command queues. Thus, during one call of the Check Trickle subroutine it is possible (but not likely) that 16 trickle commands might be built, one for each command queue.

CHECK COMMAND QUEUE

The Check Command Queue subroutine is called by the idle loop and reads the command queues sequentially starting at the next in priority until it finds a non-busy device with something queued against it. If it fails to find a device satisfying these requirements it returns to the caller with a return code of zero in GA. If it is successful in finding a device satisfying these requirements it leaves the found queue in the staging buffer and returns with a non-zero value in GA.

Figure 12A:
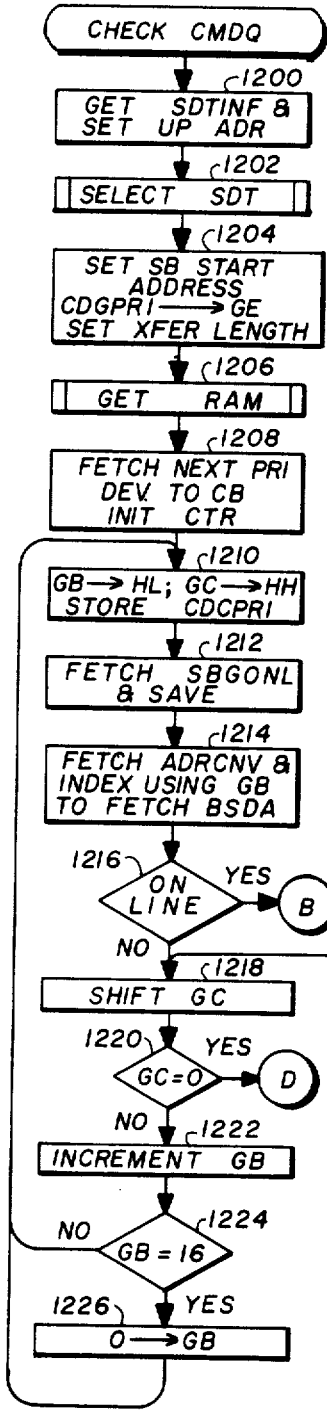
FIGS. 12A-12D comprise a flow diagram illustrating the Check Command Queue subroutine.

As illustrated in FIG. 12A, the Check Command Queue subroutine begins by fetching SDTINF from the control store. This word provides information as to the location of the SDT in the cache. A Select SDT subroutine is then called to select and reserve access to the SDT in the cache memory. At step 1204 the parameters are set for bringing the command queue header for the next priority device from the RAM and placing it in locations SBCMDQ and SBCMQH of the staging buffer. Only two words are transferred, the first word being at the RAM location specified by CDGPRI which is the RAM starting address for the command queue header corresponding to the device having highest priority. After these parameters are set a Get Ram subroutine is executed in order to fetch the two header words into the staging buffer.

At step 1208 the first header word is fetched from the staging buffer, masked, and the device number saved in GB. GC is used as a loop iteration counter for determining when all of the command queues have been checked for a queued command.

The loop begins at 1210 where the current device number is entered into HL, the count in GC entered into HH and the result saved in the control store at CDCPRI.

At step 1212 the on-line mask word SBGONL is fetched and saved in GD. At step 1214 the base address ADRCNV of the address conversion table is added to the device number and the bit significant device address for the device is fetched from the control store. The bit significant device address is then compared at step 1216 with the on-line mask word to see if the device is on line. Assuming for the moment that it is not, the program proceeds to step 1218 where GC is right-shifted one position. A check is then made at step 1218 to see if GC has been reduced to zero. Since this will not happen until sixteen devices have been checked, the program proceeds to step 1222 where the device number in GB is incremented. A test is then made at step 1224 to see if GB=16. If GB is not equal to 16 the program loops back to step 1210. However, if GB=16 then at step 1226 GB is set to zero and the program returns to step 1210. The reason for this is that all sixteen command queue headers, corresponding to the sixteen devices, must be checked but the actual checking operation starts with the next highest priority device as specified by CDCPRI. Steps 1224 and 1226 thus insure that if, for example, CDCPRI is initially 14 thereby specifying device 14, device 15 is checked and then devices 0, 1—13 in sequence.

The loop comprising steps 1210–1226 is repeated, each time updating CDCPRI, addressing the address conversion table to obtain the bit significant device address, and comparing it with the on-line mask word to see if the corresponding device is on line. Assuming no devices are on line then after the sixteenth execution of the loop GC will be found equal to zero at step 1220. The program branches to FIG. 12D where a not found indicator is stored in GA. A subroutine is then executed to release the SDT after which zero is entered into a register designated CT which is associated with the cache interface control 112. A return is then made to the idle loop with an indication in GA that no command queues were found having a command queued against them.

Figure 12B:
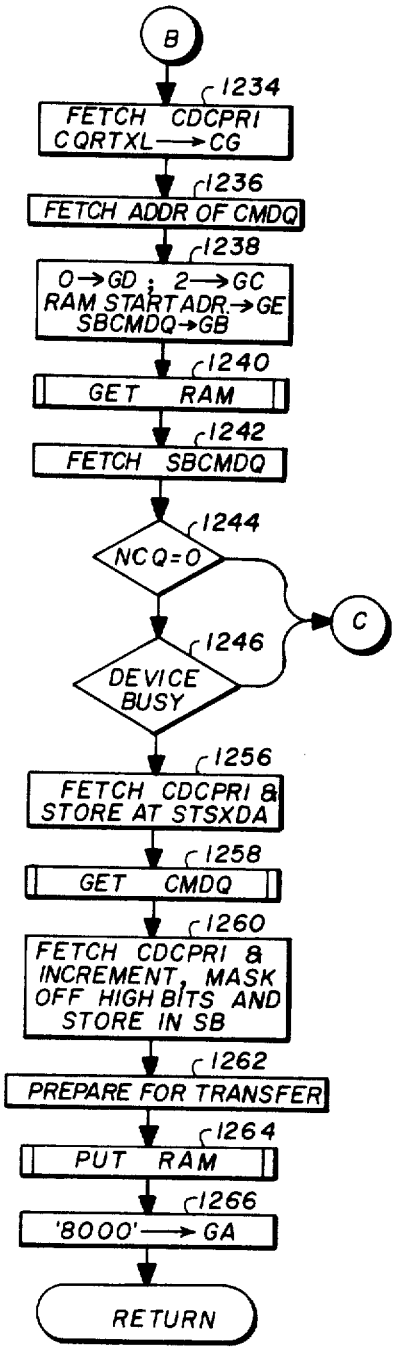
Figure 12C:
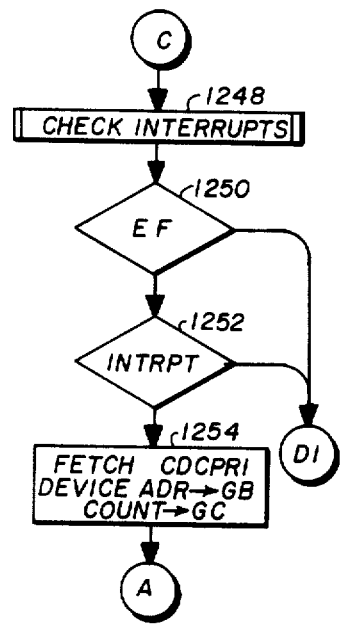
Figure 12D:
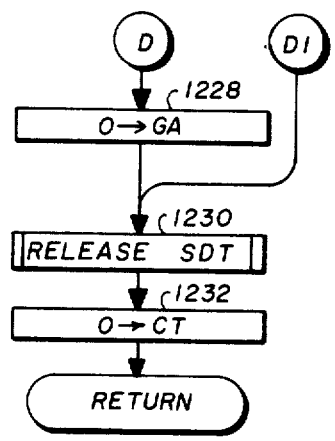

Returning to step 1216, if the test shows that the device being tested for is on line the program branches to step 1234 in FIG. 12B where CDCPRI is fetched. At this time the high orders of CDCPRI contain the count stored therein from GC at step 1210 and the low orders contain the device number also entered therein at step 1210.

The base address of the command queue translator table CQRTXL is fetched and added to the device number in CDCPRI. The result is used to access the table and fetch the address of the command queue for the on-line device. At step 1238 preparations are made for bringing the command queue header for the on-line device into the staging buffer from the RAM. A zero is entered into GD to indicate that the routine about to be called is to fetch information and the value 2 is entered into GC to indicate that two words are to be transferred. The address obtained in step 1236 is placed in GE to specify the starting address in RAM for the transfer and the address of SBCMDQ is placed in GB to specify the starting location in the staging buffer to receive the data transfer. After these operations are accomplished the Get Ram subroutine is called to fetch the command queue for the on-line device into the staging buffer.

After the command queue header for the on-line device is entered into the staging buffer the first header word is fetched and at step 1244 the NCQ field is checked to see if there are any commands on this queue.

If there are, then a test is made at step 1246 to see if the device serviced by this command queue is busy.

If there are no queued commands or if the associated device is busy then there is no work that can be performed with respect to this device. Therefore, the search through the loop 1210-1226 should be resumed. However, before the search is resumed the program branches to FIG. 12C where a Check Interrupts subroutine is called at step 1248. At step 1250 a check is made to see if there is an EF from a host and at step 1252 a check is made to see if the subroutine of step 1248 located any interrupts requiring processing. If there is an EF or a pending interrupt, the subroutine branches from step 1250 or 1252 to FIG. 12D where it releases the SDT, clears the CT register and returns to the idle loop where it will locate the particular operation which needs to be done.

If there are no EFs or pending interrupts then at step 1254 CDCPRI is fetched, its device number is entered in GB and its count entered into GC. The program then returns to step 1218 and continues checking the devices in sequence for an on-line device. As before, if an on-line device is found then at step 1216 a branch is taken to step 1234 to see if the device is not busy and has a command queued for it.

If an on-line device is found which is not busy but has a command queued against it, the program proceeds from step 1246 to step 1256 where it prepares to obtain the entire command queue for the non-busy device. CDCPRI is fetched and stored at STSXDA as the current device number. The device number in HL is entered into GD and a Get Command Queue subroutine is called to fetch the command queue for the non-busy device from the RAM to the staging buffer.

The operations in step 1260 fetch CDCPRI from the control store and increment it by 1 to set the next device priority. The device number is masked off and saved at the first address in the staging buffer. At step 1262 preparations are made for transferring two words from the staging buffer starting at location zero to the RAM starting at address CDGPRI. The Put Ram subroutine is then called to accomplish the transfer. At step 1266 the value 8000 is loaded into GA to indicate to the calling routine that the Check Command Queue subroutine has found a command for execution. A return is then made to the idle loop and at step 504 the indicator in GA causes the idle loop to branch to the Service Command Queue routine.

FIND COMMAND QUEUE ENTRY

Figure 13A:
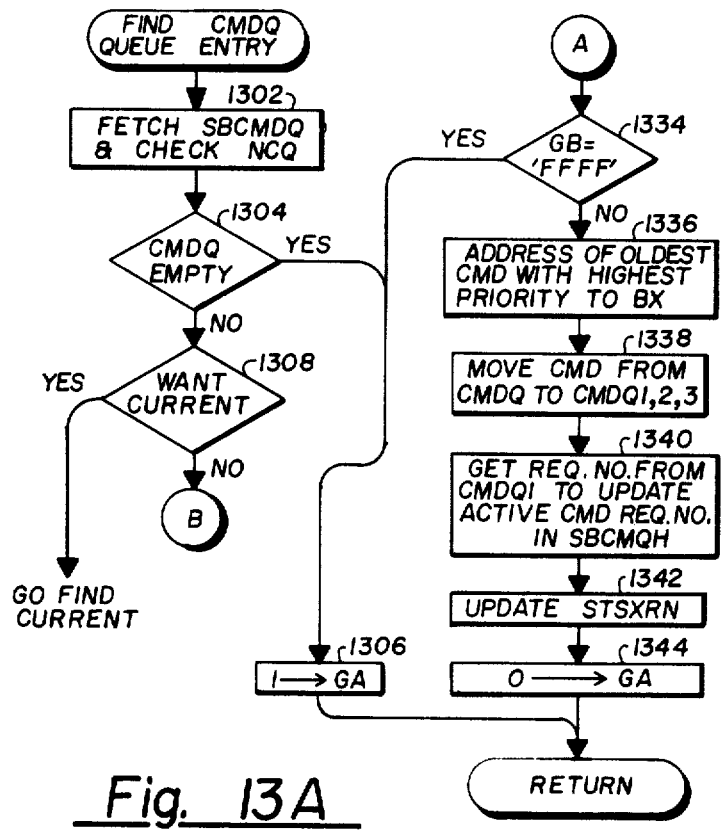
FIGS. 13A and 13B comprise a flow diagram illustrating the Find Command Queue Entry subroutine.
Figure 13B:
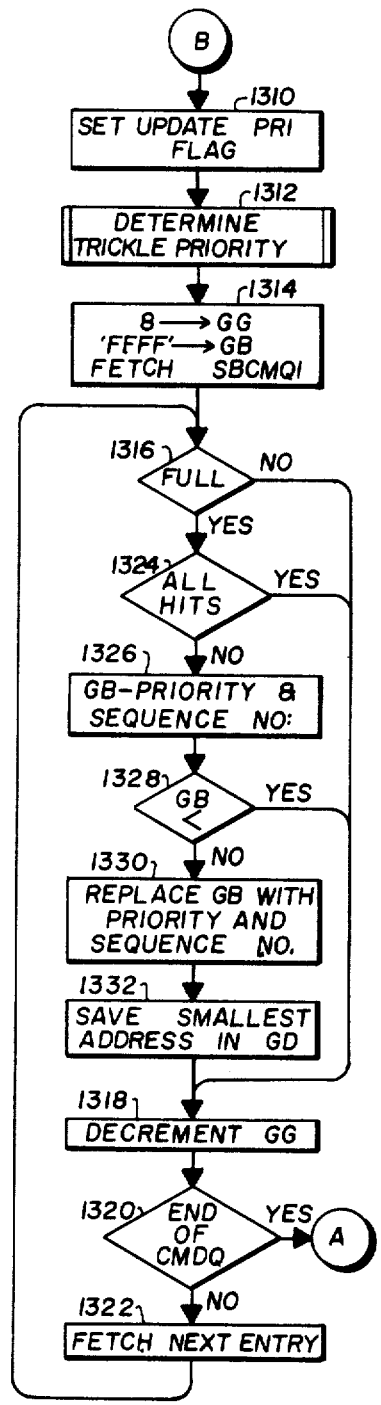

FIGS. 13A and 13B comprise a flow diagram illustrating the Find Command Queue Entry subroutine. This subroutine is called by the Cache Breakout routine to find a current command or is called by the Service Command Queue routine to look for the next highest priority entry in the command queue for execution. FIGS. 13A and 13B illustrate only those operations of the subroutine executed when the subroutine is called by the Service Command Queue routine.

At the time the subroutine is called CMDQ1 and CMDQ2 are in the control store and a copy of the command queue is in the staging buffer beginning at location SBCMDQ. The routine begins at step 1302 by fetching the first header word for the command queue and checking NCQ to see if there are any commands queued for this device. If NCQ=0 then there are no queued commands for this device and at step 1304 the program branches to step 1306 where the value 1 is entered into GA. This is a return code for the calling routine to inform the calling routine that the subroutine was unsuccessful in finding an entry. After GA is set the subroutine returns to the calling routine.

If the command queue is not empty then from step 1304 the program proceeds to step 1308 where the request code provided by the calling routine in GA is tested to see if the calling routine wants the subroutine to find the current or the next highest priority entry. If the current entry (EF2) is wanted the program branches to a sequence of steps (not shown) to find the current entry. These steps are not relevant to the present invention.

If the test at step 1308 indicates that the next highest priority entry is to be found, the program proceeds to FIG. 13B where step 1310 loads the value 8000 into GA after which the Determine Trickle Priority subroutine is called. The value loaded into GA tells the Determine Trickle Priority subroutine that it is to update the priority of the trickle command in the command queue after priority has been determined.

Afte trickle priority has been determined and the command updated at step 1312, preparations are made at step 1314 for searching the command queue for the entry having the highest priority and the lowest sequence number. The value 8 is loaded into GG and the value FFFF is loaded into GB after which the first word of the first entry in the command queue (SBCMQ1) is fetched.

At step 1316 SBCMQ1 is tested to see if the full bit is set indicating a command in the first entry slot. If the full bit is not set the program branches to step 1318 where the count in GG is decremented. At step 1320 the decremented value is tested to see if it is zero. If it is not, then the first word of the next entry in the command queue is addressed and fetched at step 1322. The program then loops back to step 1316 to test the full bit of the second entry.

Assume for the moment that the command queue has no commands queued for execution. The program will execute the loop of steps 1316, 1318, 1320 and 1322 eight times. After the eighth run through the loop the test at step 1320 will find that the decremented value of GG is equal to zero. The program then branches from step 1320 to FIG. 13A.

Assume now that one of the tests at step 1316 indicates that the command queue entry being tested contains a command. The program proceeds to step 1324 where the Allhits bit in the first word of the command is checked to see if it is set. If this bit is set it means that this command is presently being executed by the other SCU. Therefore, from step 1324 the program jumps to 1318 and proceeds as previously described.

If the full bit is set and the Allhits bit is not set in SBCMQ1 of a command queue entry, then the command is a candidate for execution. However, it should be executed only if it is the highest priority command. As between commands with the same priority level, then the command with the lowest sequence number should be selected for execution since it has been in the queue for the longest period of time. The priority value and sequence number from word 1 of the command queue entry are concatenated with the priority value being the high order positions of the resulting value. At step 1326 this value is subtracted from the value in GB and the result is tested at step 1328. Since the value in GB is FFFF, GB cannot be less than the priority and sequence number value for the first full entry where Allhits is not set. Therefore, at step 1330 the priority and sequence number value for the command entry is entered into GB and the address of word 1 of the command queue entry is saved in GD. The program then proceeds to step 1318 where GG is incremented and then to step 1320 to see if all of the command queue entries have been checked. If they have not, the first word of the next command queue entry is fetched and the full and Allhits bits checked. Assuming that the full bit is set and the Allhits bit is reset, the priority and sequence number of this entry is compared with the priority and sequence number in GB. If GB is less then the program branches from step 1328 to step 1318 and repeats the loop without changing the value in GB. However, if the test at step 1328 indicates that the priority and sequence number for the entry being checked is less than the value in GB then the priority and sequence number for the present entry is inserted in GB at step 1330 and the address of this entry saved in GD at step 1332.

After all command queue entries have been checked, GD will contain the relative address in the command queue of that entry which has the highest priority and the lowest sequence number. After all command queue entries have been checked the value in GG has been decremented to zero and this condition is detected at step 1320. The program then branches to FIG. 13A where, at step 1334, the value in GB is compared with the value FFFF. If GB=FFFF it means that all of the slots in the command queue were empty or any full slot contained a command being executed by the other SCU. Therefore, the subroutine has found no entry for execution. A branch is taken to step 1306 where GA is set to indicate the "nofind" condition to the calling routine. A return is then taken to the calling routine.

At step 1334, if GB is not equal to FFFF it means that the subroutine has found a command to be executed. The address of this command, which is the oldest command with the highest priority, is derived from GD and utilized to access the staging buffer. The three words comprising the command queue entry are transferred from the staging buffer to locations CMDQ1, CMDQ2 and CMDQ3 in the control store. At step 1340 the request number from CMDQ1 is entered into SBCMQH in the active command request number field. At step 1342 the request number from CMDQ1 is used to update the request number location STSXRN in the control store. At step 1344 GA is cleared to indicate to the calling routine that a command was found for execution, and after GA is updated a return is made to the calling routine.

UPDATE TACK/WT

FIGS. 14A–14F illustrate the Update TACK/WT subroutine. It is this subroutine which is called to update the TACK and written-to (WT) bits in the second word of an SDT entry. Two running counts are maintained, one count indicating the number of written-to segments in cache and the other indicating the number of empty segments in cache. The subroutine increments or decrements one or both of these counts depending upon what operation it is called upon to do. After the counts have been updated the subroutine calls the Add/Delete Timestamp subroutine to update the timestamp table. Upon return from the timestamp table the Update TACK/WT subroutine returns to the calling routine.

The Update TACK/WT subroutine is called any time a change is made in the segment descriptor table entries. Thus, it may occur when an SDT entry is formed, when an SDT entry is deleted or when the SDT is updated. The calling routine passes to the Update TACK/WT subroutine a parameter in GA indicating whether the TACK bit should be set or reset, the WT bit should be set or reset, or the TACK bit set and the SDT entry in the RAM updated. For updating the RAM, the calling routine places the SDT entry relative pointer in GB prior to calling the Update TACK/WT subroutine.

Referring to FIG. 14A, the Update TACK/WT subroutine begins by fetching the second word of the SDT entry from the staging buffer and placing the high half of the word in GE. Next, the count of the number of written-to segments SBGWTS is fetched from the staging buffer and placed in GD. The count of the number of empty segments SBGMTS is fetched from the staging buffer and held in HL.

At steps 1404, 1406, 1408, 1410 and 1412 the value in GA is tested to see if the calling routine has instructed that the TACK bit be reset, the WT bit reset, the TACK bit set, the WT bit set, or the TACK bit set and the SDT entry in the RAM updated. If the value in the GA register does not call for any of these operations then at step 1412 a branch is taken and a STOP instruction executed to stop the SCU because of the input parameter error.

At step 1404, if the test indicates that the subroutine was called to reset the TACK bit a branch is taken to step 1414 to see if the TACK bit is on. If it is, the TACK bit is reset in the high half of the SDT entry word 2 contained in GE.

When counting the number of empty segments in cache, those segments which are tacked, or are written-to as indicated by word 2 of the corresponding SDT entry are excluded from the count. Since a TACK bit was reset at step 1415 the number of empty segments is increased only if the untacked segment does not have the WT bit on. A test is made at step 1416 and if the WT bit is on the count of the number of empty segments in HL is incremented at step 1418. The program then proceeds to FIG. 14E where the number of empty segments in HL is stored in the staging buffer at SBGMTS. The number of written-to segments in GD has remained unchanged and this value is returned to SBGWTS. The second word of the SDT entry is fetched and the high order half-word updated with the contents of GE with the result being returned to SBSDT2.

At step 1476 bit 7 of the ST register is tested to see if it is set. This bit was reset at step 1402 and has remained unchanged. Therefore, from step 1476 the program returns to the calling routine. This bypasses the Add-/Delete Timestamp subroutine since there has been no change in the number of written-to segments.

If step 1414 finds that the TACK bit is not on, or if it is on step 1416 finds that the WT bit is on, then no change is made in the count of number of empty segments. The program proceeds directly from step 1414 or 1416 to FIG. 14E where the same operations are performed as previously described. However, in this case the count of the number of empty segments in HL has not been incremented hence the same values read from SBGMTS, SBGWTS and SBSDT2 at step 1402 are returned to the staging buffer at step 1474.

If the calling routine has passed a parameter in GA indicating that the TACK bit should be set, this is detected at step 1408. The program branches to FIG. 14C where the TACK bit is tested at step 1438 to see if it is on. If it is, the program branches immediately to FIG. 14E. If the TACK bit is not on it is set in GE at step 1440 and at step 1442 a test is made to see if the WT bit is on. If it is, the program branches to FIG. 14E. If the WT bit is not on then the setting of the TACK bit at step 1440 has decreased by one the number of empty segments. At step 1444 the number of empty segments in HL is decremented by one and the program proceeds to FIG. 14E.

If the calling routine has set an indicator in GA to indicate that the WT bit should be reset, this condition is detected at step 1406 and the program branches to FIG. 14B. At step 1420 the written-to bit is tested and if it is not on the program proceeds to FIG. 14E. If the WT bit is on it is reset at step 1421. At step 1422 the device address STSXDA is fetched and saved in GA and SBTKSA, the base address of the BSDA trickle table is fetched. The two values are added and used to index the table. The value read therefrom at step 1423 is decremented and returned to the table at step 1424.

At step 1425 the number of written-to segments in GD is decremented, ST7 is set, and the value 4000 is entered into GA as a parameter for the Add/Delete Timestamp subroutine which will be called. At step 1426 the TACK bit is tested and if it is not on the count of the number of empty segments is incremented. If the TACK bit is on then the incrementing of the number of empty segments is bypassed.

In either case, the program proceeds to FIG. 14E where SBGMTS, SBGWTS and SBSDT2 are updated. At step 1476 it is found that bit 7 of the ST register is set. The Add/Delete Timestamp subroutine is called at step 1478 and, after completion of this subroutine a return is made from the Update TACK/WT subroutine to its calling routine. The value 4000 entered into GA at step 1425 tells the Add/Delete Timestamp subroutine that it should delete a timestamp entry from the timestamp table.

If the routine which calls the update TACK/WT subroutine has set an indicator in GA to indicate that the WT bit should be set, this condition is detected at step 1410 and the program branches to FIG. 14D. A test is made to see if WT is on and if it is, the program branches to FIG. 14E, updates SBGMTS, SBGWTS and SBSDT2 and then returns to the calling routine, bypassing the Add/Delete Timestamp subroutine.

If the test at step 1430 indicates that the WT bit is on then it is reset at step 1431. Steps 1432, 1433, and 1434 fetch STSXDA and SBTKSA, add the two, index the table of SDT addresses of segments waiting to be trickled, increments the count in the high half-word of the entry indexed and restores the entry. At step 1435 the number of written-to segments is incremented, bit 7 set in the ST register and the value 8000 entered into GA.

At step 1436 the TACK bit is tested and if it is on the program proceeds to FIG. 14E. If the TACK bit is not on then the number of empty segments is decremented and the program proceeds to FIG. 14E. In FIG. 14E, SBGMTS, SBGWTS and SBSDT2 are all updated. At step 1476 the test shows that ST7 is set so the Add/Delete Timestamp subroutine is called. Since GA contains the value 8000 the Add/Delete Timestamp subroutine will add an entry to the timestamp table. After the Add/Delete Timestamp subroutine is completed a return is made to the Update TACK/WT subroutine and from there a return is made to that routine which called the Update TACK/WT subroutine.

Figure 14F:
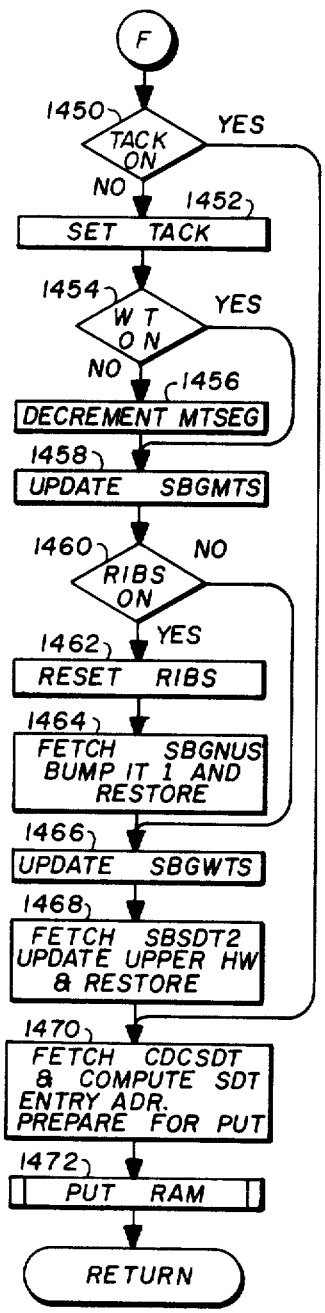

If the routine which calls the Update TACK/WT subroutine has placed a value in GA requesting that the TACK bit be set and the SDT entry in the RAM updated, this condition is detected at step 1412 and the program branches to FIG. 14F. The TACK bit is tested at step 1450 and if it is already on the program branches to step 1470 where the base address of the SDT table in RAM (CDCSDT) is fetched and added to the SDT entry relative pointer which was passed to the Update TACK/WT subroutine by the caller in register GB. The result is the absolute address of the SDT entry in the RAM.

Preparations are made for transferring the SDT entry to RAM. These preparations include loading the starting location of the SDT in the staging buffer into GB, setting the value into GC as the length of the transfer to take place, and setting bit F of the ST register to indicate that the routine about to be called is to put data into the RAM. At step 1472 the Put Ram subroutine is called to accomplish the transfer of the four word SDT entry to the SDT in the RAM. Upon completion of the subroutine a return is made to the Update TACK/WT subroutine and then a return is made to the routine which called the Update TACK/WT subroutine.

ADD/DELETE TIMESTAMP

The Add/Delete Timestamp subroutine adds or deletes a timestamp entry from the timestamp table located in the cache memory. The calling routine place the value 8000 in GA if the Add/Delete Timestamp subroutine is to add a timestamp entry and places the value 4000 in GA if the subroutine is to delete a timestamp entry. The calling routine also passes the SDT address of the entry to be operated on in GE. The Add/Delete Timestamp subroutine first generates the address of the entry in the timestamp table from the SDT address and then checks GA to see whether an add or a delete operation is to be performed.

For an add operation, the new entry is loaded with the timestamp sent from the host, the LFL bit in word 2 of the entry is set and all bits of the forward link are set. If a previous entry exists, the backward link of the new entry is loaded with the address of the prior entry and LBL of the new entry is reset, the newest entry pointer loaded with the new entry address, LFL of the previous entry is reset, and the forward link of the previous entry is loaded with the address of the new entry.

If the new entry is the only entry in the timestamp table, LBL and BL of the new entry are set to ones, the newest entry pointer and the oldest entry pointer are loaded with the address of the new entry, and TOLDEST is loaded with the timestamp of the new entry.

For a delete operation, the timestamp, LBL, and LFL are reset while BL and FL are both set to all ones. If the entry is the last valid entry in the timestamp table, TOLDEST is reset while the newest entry pointer and the oldest entry pointer are reset. If the entry is the newest entry, LFL and FL of the previous entry are set and the newest entry pointer updated to point to the previous enrry. If the entry is the oldest entry, LBL and BL of the next entry are set, the newest pointer is updated to point to the next entry, and TOLDEST is loaded with the timestamp of the next entry. If the entry being deleted is the only entry, the newest entry pointer and the oldest entry pointer are both set and TOLDEST is reset.

Figure 15E:
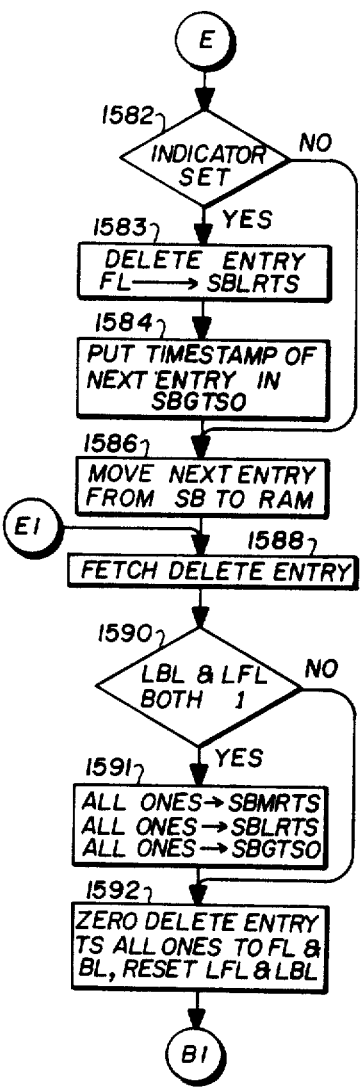
FIGS. 15A-15E comprise a flow diagram illustrating the Add/Delete Timestamp subroutine.
Figure 15A:
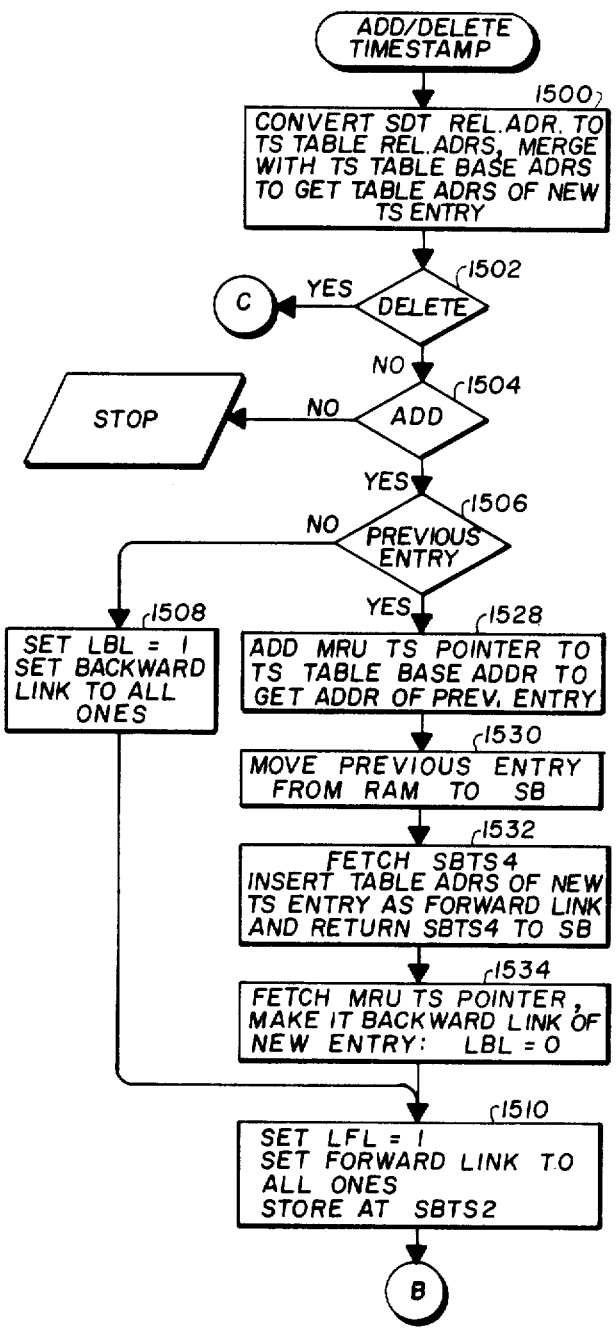

The Add/Delete Timestamp subroutine begins in FIG. 15A by dividing the SDT relative address by two to obtain the timestamp table relative address. The reason for this is that there are four words per SDT entry but only two words per timestamp table entry. The timestamp table relative address is then added to the base address of the timestamp table to obtain the absolute table address of the timestamp entry.

At step 1502 the input parameter in GA is tested to see if it calls for a delete operation. Assuming it does not, the input parameter in GA is then tested to see if it calls for an add operation. If it does not the program executes a STOP instruction since the input parameters are not valid.

If the test at step 1504 indicates that an add operation is to be performed then one entry is made in the timestamp table. The exact operations to be performed in order to add an entry depend upon whether or not the new entry will be the only entry in the timestamp table or whether there is a previous entry already in the timestamp table. If there is no previous entry in the timestamp table then SBMRTS (the timestamp pointer to the newest timestamp table entry) will be all ones. SBMRTS is checked at step 1506.

Assuming that there is no previous entry in the timestamp table the program branches to step 1508 where a word is built which will set the last backward link indicator bit (LBL) to 1 (see FIG. 4) and set the backward link to all ones. The program then proceeds to step 1510 where the rest of the timestamp entry word is built. LFL is set to 1 and the forward link is set to all ones. The word generated by steps 1508 and 1510 is then stored in the staging buffer at SBTS2 which is the location of the second word of the current (new) timestamp table entry. At step 1512 the timestamp table relative address of the new entry is stored at SBMRTS as the new newest entry pointer.

At step 1514 another check is made to see if there was a previous entry and, if there was not, the new entry relative address is stored in the staging buffer at the location SBLRTS which holds the pointer to the oldest timestamp table entry.

At step 1518 the channel timestamp (CEF5) is fetched from the control store and entered into SBTS1 which is the first word of the new entry in the staging buffer.

At step 1520 another check is made to see if there was a previous entry and if there was not the program moves to step 1522 where the channel timestamp is entered into SBGTS0, the location in the staging buffer reserved for the oldest timestamp TOLDEST.

A check is made again at step 1524 to see if there was a previous entry and again assuming that there was not the program proceeds to step 1526 where the newly formed timestamp table entry in SBT1 and SBT2 is stored in the timestamp table in the RAM at the absolute table address derived in step 1500. The Add/Delete Timestamp subroutine then returns to the Update TACK/WT subroutine which called it.

If there is a previous entry in the timestamp table at the time the Add/Delete Timestamp subroutine is called to add a new entry, the forward link and LFL bit of the previous entry must be adjusted and the new entry must be made to have a backward link pointing to the previous entry.

If the test at step 1506 indicates that there is a previous entry in the timestamp table the program proceeds to step 1528 where the newest timestamp pointer (SBMRTS) is added to the base address of the timestamp table to obtain the absolute address of the previous entry. This address is then utilized to address the RAM and move the previous entry from the RAM to the staging buffer at locations SBTS3 and SBTS4.

At step 1532 the previous entry is fetched from SBTS4 for the purpose of building a word to update SBTS4. The absolute timestamp table address of the new entry is inserted as the forward link and the LBL bit is cleared. The resulting word is then returned to the staging buffer at location SBTS4.

The links of the new entry are now formed. The newest timestamp pointer SBMRTS is fetched and made the backward link of the new entry. At step 1510 LFL is set and all ones are inserted into the word as the forward link. The resulting word is stored at SBTS2 as word 2 of the new timestamp table entry.

It is now necessary to update the global variables and load the timestamp into word 1 of the new entry. At step 1512 the relative table address of the new entry is stored at SBMRTS as the new newest timestamp entry. The test at 1514 proves true so the program proceeds to step 1518 where the channel timestamp CEF5 in the control store is inserted as the timestamp in word 1 of SBTS1.

The test at steps 1520 and 1524 both indicate a previous entry and at step 1536 a routine is called to put the previous entry back in the RAM from the staging buffer. At step 1526 the newly formed entry is transferred from the staging buffer to the timestamp table in the RAM. A return is then made to the calling routine.

Figure 15B:
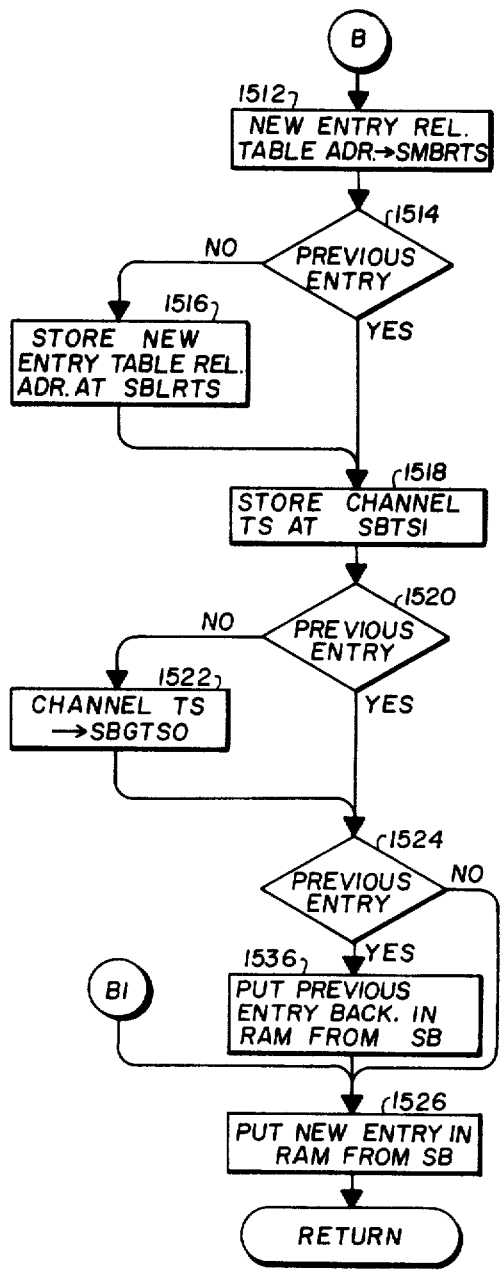
Figure 15C:
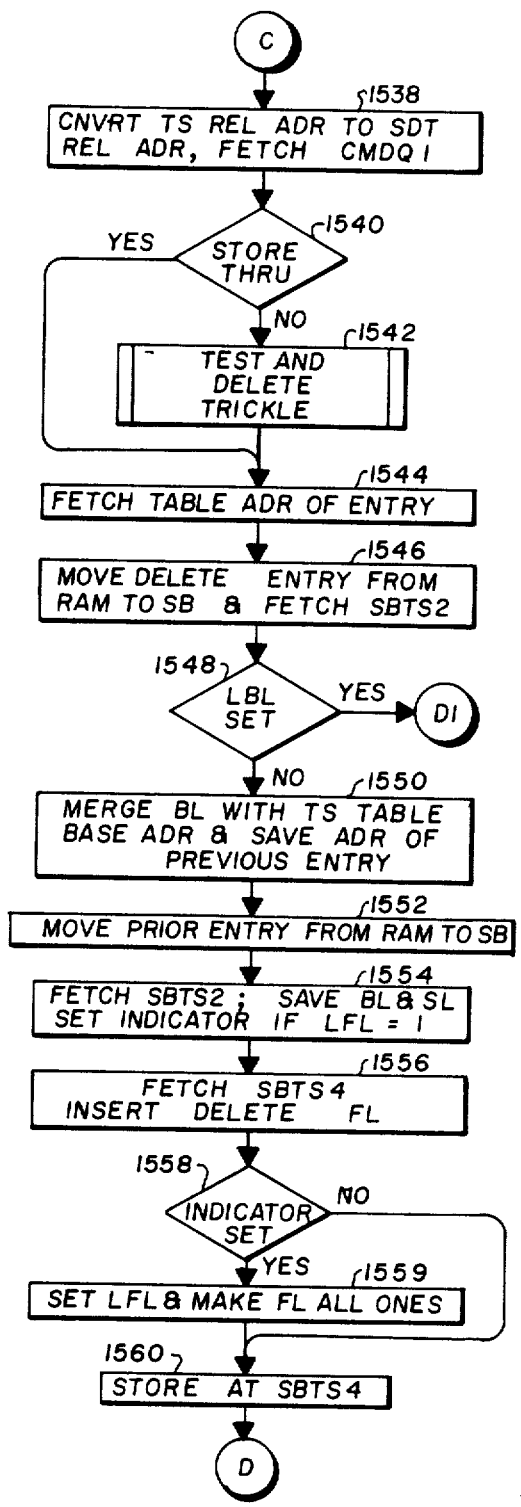

In order to delete an entry from the timestamp table the Add/Delete Timestamp subroutine proceeds as follows. At step 1502 the test of the parameter passed by the calling routine shows that the calling routine wishes an entry deleted from the timestamp table. A branch is taken to FIG. 15C where the timestamp table relative address of the entry to be deleted is converted to an SDT relative address by multiplying it by 2. The SDT relative address may or may not be used as subsequently described. CMDQ1, the first word of the cache command as stored in the control store, is fetched and checked to see if a STORE THROUGH command is being executed. If it is, a branch is taken from step 1540 to step 1544. If the test at step 1540 indicates that a STORE THROUGH command is not being executed then it is necessary to call a Test and Delete Trickle subroutine. This routine is invoked whenever a segment has its WT bit in the SDT entry reset or a segment is deleted from the SDT. If a trickle is pending in the command queue of the associated device and has the same segment device relative address, the trickle entry in the command queue is deleted and the skip trickle flag in SBGTSK is reset. The purpose of the Test and Delete Trickle subroutine is to avoid attempting to trickle a segment which has been deleted or whose WT bit in the SDT entry is no longer set. Since the Test and Delete Trickle subroutine is not relevant to an understanding of the present invention, it is not described further.

At step 1544 the absolute table address of the delete entry (that is, the entry to be deleted) is fetched and the parameters are set up for a two word transfer which transfers the delete entry from the timestamp table in the RAM to locations SBTS1 and SBTS2 in the staging buffer. SBTS2 is then fetched from the staging buffer and the LBL bit is checked. Assuming for the moment that it is set, the program branches from step 1548 to FIG. 15D, where, at step 1566, SBTS2 is again fetched. The LFL bit is checked at step 1568. If it is also set it means that the entry to be deleted is the only entry in the timestamp table. The program branches from step 1568 to FIG. 15E. At step 1588 SBST2 is again fetched and at step 1590 the LBL and LFL bits are checked to see if they are both 1. Under the assumed circumstances they are so the program proceeds to step 1591 where SBMRTS, SBLRTS and SBGTSO are set to all ones.

At step 1592 a zero is entered into SBTS1 thereby providing a zero timestamp in the deleted entry. A word is built up and inserted in SBTS2, this word having all ones in the forward and backward links with LFL and LBL reset. The program then returns to FIG. 15B where, at step 1526, the new entry, that is, the deleted entry, is transferred from SBTS1 and SBTS2 in the staging buffer to its appropriate location in the timestamp table contained in the RAM. The subroutine then returns to the calling routine.

If the entry being deleted is not the only entry in the timestamp table then adjustment will have to be made in either the forward link address of the previous entry in the chain, the backward link of the next entry in the chain, or both the forward link in the previous entry and the backward link in the next entry depending upon whether the entry to be deleted is the newest entry, the oldest entry, or some entry intermediate the newest entry and the oldest entry.

Assume that the entry to be deleted is the oldest entry. When SBTS2 is fetched and LBL tested at step 1548 it is found to be set. The program branches to FIG. 15D, again fetches SBTS2 at step 1566 and tests LFL at step 1568. If the entry is not the newest entry then from step 1568 the program proceeds to step 1570. The forward link of the delete entry is added to the base address of the timestamp table to obtain the RAM address of the next entry. The two-word next entry is moved from RAM to locations SBTS3 and SBTS4 in the staging buffer.

At step 1574 SBST2 is fetched and the forward and backward links of the delete entry saved. LBL is tested to set an indicator, and under the assumed condition this indicator is set. At step 1576 the second word of the next timestamp table entry is fetched.

At step 1578 the indicator set at step 1574 is tested and since under the assumed conditions it is set, the program proceeds to step 1579 where the backward link is set to all ones and LBL is set to 1. The word built up at steps 1576 and 1579 is then stored as the second word of the next timestamp table entry.

Thus, if the entry being deleted is the oldest entry in the timestamp table the backward link and the LBL bit of the next entry are all set to ones. The forward link and LFL of the next entry are left unchanged.

From step 1580 the program proceeds to FIG. 15E where it adjusts the global variables. A test is made at step 1582 to see if the indicator was set at step 1574. Under the assumed conditions the indicator is set and the program proceeds to step 1583 where the forward link of the delete entry is entered in the staging buffer at SBLRTS. Since this forward link specifies the address of the next entry, the address of the next entry becomes the address of the oldest timestamp table entry.

At step 1584 the timestamp of the next entry is transferred from SBTS3 to the location SBGTSO in the staging buffer as the oldest timestamp in the timestamp table. At step 1586 the two words comprising the next entry are transferred from the staging buffer to the timestamp table in the RAM.

At step 1588 the second word of the delete entry is fetched and checked to see if LBL and LFL are both 1. Under the assumed conditions they are not so the program branches to step 1592 where it zeros the timestamp, sets FL and BL to all 1's, and resets LFL and LBL for the delete entry. The program then returns to FIG. 15B, step 1526, where the delete entry is transferred from the staging buffer to the timestamp table in the RAM. The program then returns to the calling routine.

Assume now that the Add/Delete Timestamp subroutine is called for the purpose of deleting an entry which is the newest entry in the timestamp table. In FIG. 15A, steps 1500 and 1502 are executed and a branch taken to FIG. 15C where the steps previous described are executed down to step 1548. At this point the test will find that the LBL bit is not set and the program proceeds to step 1550 where the backward link of the delete entry is merged with the timestamp table base address to obtain the table address of the previous entry. The address thus derived is utilized at step 1552 to move the previous entry from the timestamp table to locations SBTS3 and SBTS4 in the staging buffer.

At step 1554 word 2 of the delete entry is fetched and the forward link and backward link addresses saved. An indicator is then set if LFL of the delete entry is a 1. Under the assumed conditions this is true.

At step 1556 the second word of the previous entry is fetched for the purpose of building a new word for this entry. At step 1558 a test is made to see if the indicator was set at step 1554. Since it was, the forward link of the word being built is set to all ones and the LFL bit is set. The resulting word is stored at SBTS4. The net result of steps 1556 and 1559 is that the forward link of the previous entry is set to all ones and its LFL bit set to indicate that the entry is now the last or newest entry in the timestamp chain.

Figure 15D:
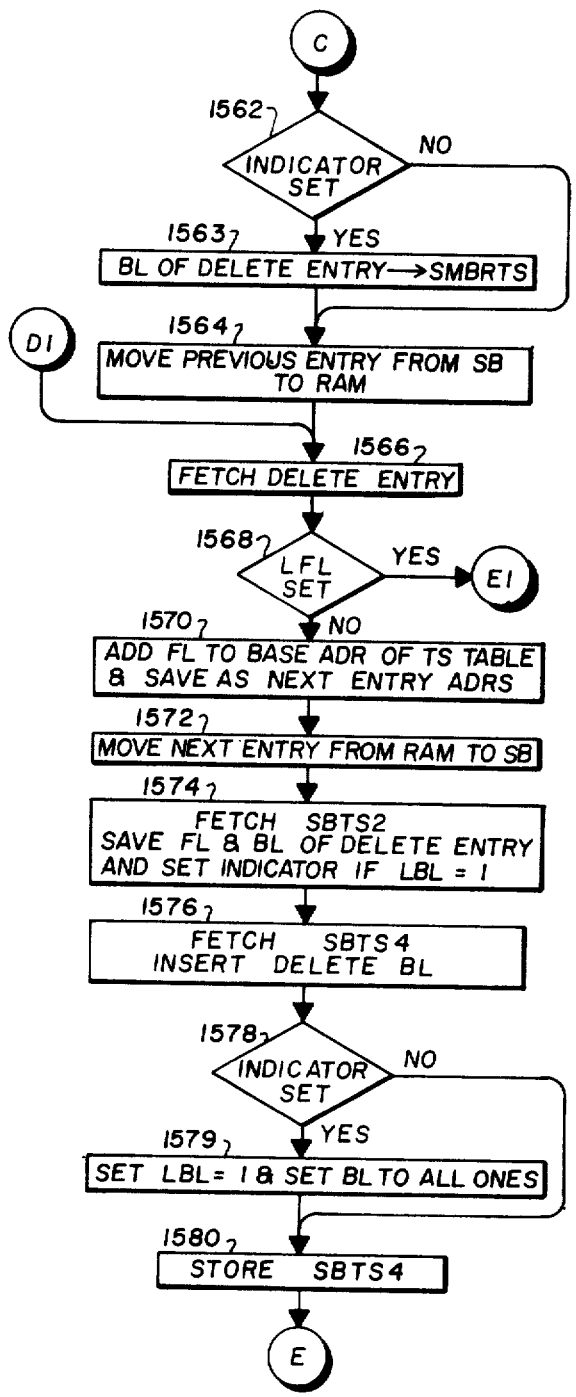

From step 1560 the program proceeds to FIG. 15D where another test is made at step 1562 to see if the indicator was set at step 1554. Under the assumed conditions it was so the program proceeds to step 1563 where the backward link of the delete entry is sent to the staging buffer and stored at SBMRTS. Since the backward link of the delete entry is the address of the previous entry, the previous entry becomes the newest entry in the timestamp table.

At step 1564 the updated previous entry is transferred from the staging buffer to its location in the timestamp table in the RAM.

At step 1566 the delete entry is fetched and its LFL bit checked. Since it is assumed that the delete entry is the last entry in the table the program branches to FIG. 15E where the delete entry is again fetched at step 1588 and checked at step 1590 to see if both LBL and LFL are set. Since it is assumed that the entry being deleted is not the only entry in the timestamp table the program branches to step 1592 where the timestamp in word 1 of the delete entry is set to zero, the forward link and backward link in word 2 are both set to all ones and the LFL and LBL bits in word 2 are set to zero. The program then branches to step 1526 in FIG. 15B where the updated delete entry is transferred from the staging buffer to its location in the timestamp table in the RAM.

Assume now that the entry to be deleted is neither the first nor the last entry in a timestamp table. In this case it is necessary to adjust the forward link of the previous entry to point to the next entry and adjust the backward link of the next entry to point to the previous entry thereby removing the deleted entry from the chain. In FIG. 15A the program proceeds to decision point 1502, branches to FIG. 15C and executes steps 1538–1552 in the manner described above for the condition where the delete entry is the newest but not the only entry in the table.

At step 1554 the delete entry is fetched and the backward and forward links saved. Since LFL will not be equal to 1 the indicator is not set. At step 1556 word 2 of the previous entry is fetched for building a new word 2 for the previous entry. The forward link of the delete entry becomes the forward link of the previous entry. The backward link of the previous entry and LBL remain unchanged. At step 1558 the test will indicate that the indicator is not set so the program branches to step 1560 where the word generated at step 1556 is loaded into SBTS4 as the updated previous entry. The LFL bit is zero in the updated previous entry.

The program then proceeds to FIG. 15D where the test at step 1562 will show under the assumed conditions that the indicator is not set. Therefore, SBMRT is not updated and the program proceeds to step 1564 where the updated previous entry is transferred from the staging buffer to the timestamp table in the RAM.

At step 1566 the delete entry is fetched and the LFL bit tested. Under the assumed conditions LFL will not be set so the program proceeds to step 1570 where the forward link of the delete entry is added to the base address of the timestamp table to obtain the absolute table address of the next entry. At step 1572 the two words comprising the next entry are transferred from the RAM to the staging buffer at locations SBTS3 and SBTS4.

At step 1574 the second word of the delete entry is fetched and the forward and backward links saved. Under the assumed conditions, the indicator is not set to show that LBL is equal to 1. At step 1576 the second word of the next entry is fetched. The backward link of the delete entry becomes the backward link of the next entry. The forward link of the next entry remains unchanged.

At step 1578 the test will show that the indicator was not set at step 1574 and the program branches from step 1578 to step 1580 where the word built up at step 1576 is stored at SBTS4.

As a result of the operations at step 1576, a word is built up for updating the second word of the next entry, the word built up comprising the forward link of the next entry and the backward link of the delete entry.

From step 1580 the program proceeds to FIG. 15E where the test at step 1582 will show that the indicator was not set at step 1574. Thus, SBLRTS and SBGTSO are not updated and the program proceeds to step 1586.

At step 1586 the updated next entry is returned from the staging buffer to its timestamp table location in the RAM.

At step 1588 the delete entry is fetched and LBL and LFL checked to see if they are both ones. Under the assumed conditions they are not and the program branches to step 1592 where the timestamp in word 1 of the delete entry is set to zero, the forward and backward links in word 2 of the entry set to all ones, and the LBL and LFL bits are reset. The program then proceeds to FIG. 15B where step 1526 is executed to transfer the updated delete entry from the staging buffer to the timestamp table in the RAM. The program then returns to the calling routine.

DETERMINING TRICKLE PRIORITY

Figure 16A:
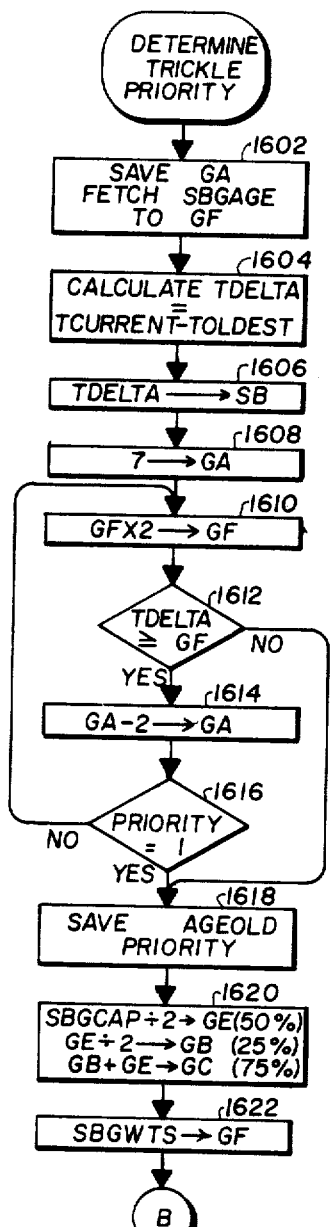
FIGS. 16A and 16B comprise a flow diagram illustrating the Determine Trickle Priority subroutine; and, FIG. 17 is a flow diagram illustrating the Read Utility routine.
Figure 16B:
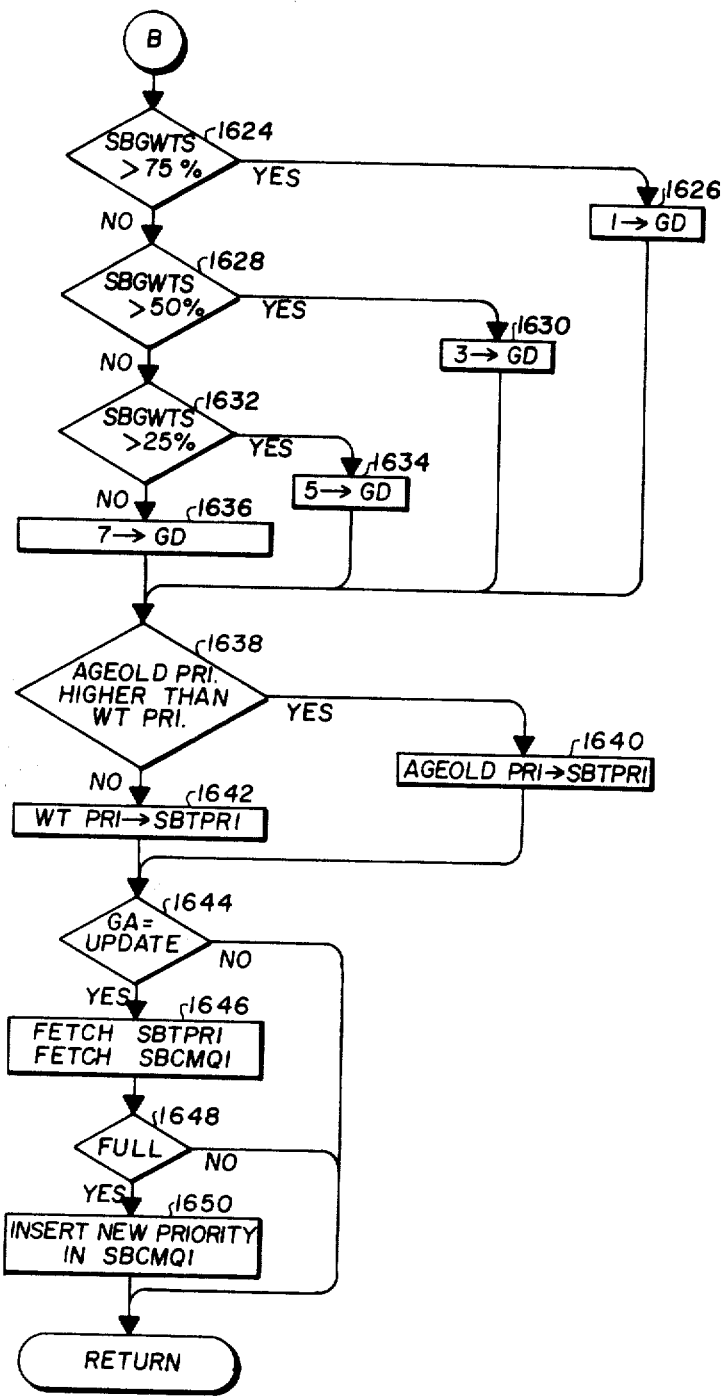

FIGS. 16A and 16B comprise a flow diagram illustrating the operations performed with respect to the determination of trickle priority. In accordance with the principles of the present invention trickle priority is computed according to two different criteria, the priorities for the two criteria are compared, and the highest priority utilized as the trickle priority.

According to one criterion, priority is computed as illustrated in Table I. According to this criterion priority is based on how long it has been since the first write to the oldest written-to segment in cache. In Table I, TDELTA represents the difference between the current timestamp and the oldest timestamp. AGEOLD is a system paramter which is loaded during system parameterization and represents the length of time that a written-to segment may remain in cache before it is considered old. If TDELTA is less than twice AGEOLD then the priority assigned according to the first criterion is 7. When TDELTA is between two and four times AGEOLD then a priority of 5 is assigned. If TDELTA is between four and eight times AGEOLD then a priority of 3 is assigned and if TDELTA is equal or greater than eight times AGEOLD then 1 is assigned as the priority. 1 represents the highest priority whereas 7 represents the lowest priority.

TABLE I

|  |  | PRIORITY |
|---|---|---|
|  | TDELTA <2 × AGEOLD | 7 (Low) |
| 2 × AGEOLD ≦ | TDELTA <4 × AGEOLD | 5 |
| 4 × AGEOLD ≦ | TDELTA <8 × AGEOLD | 3 |
| 8 × AGEOLD ≦ | TDELTA | 1 (High) |

TABLE II

|  |  | PRIORITY |
|---|---|---|
|  | Segments WT ≦25% | 7 (Low) |
| 25% < | Segments WT ≦50% | 5 |
| 50% < | Segments WT ≦75% | 3 |
| 75% < | Segments WT | 1 (High) |

Referring to FIG. 16A, reference numerals 1602–1618 identify the steps performed in order to compute priority based on the time (age) since first write of the oldest written-to segment. When the subroutine is called, an input parameter provided by the calling routine is saved in GA. If this parameter has the value 8000 it means that the Determine Trickle Priority subroutine should also update the priority of the trickle command in the command queue after computing priority. If it has the value 0000 then the trickle priority is computed but the command queue entry is not updated.

AGEOLD is moved from its location SBGAGE in the staging buffer to GF. Next, the current timestamp provided with the last read or write instruction from a host processor (TCURRENT) is fetched from SBGTSC and the timestamp of the oldest written-to segment (TOLDEST) is fetched from SBGTSO. TOLDEST is then subtracted from TCURRENT to obtain TDELTA a value representing the age since first write of the oldest written-to segment. TDELTA is stored in SB at location SBGTLD.

Once TDELTA has been computed, the value 7, representing the lowest possible priority, is entered into GA. AGEOLD, presently held in GF, is multiplied by 2 and the result returned to GF. At step 1612, a test is made to see if TDELTA is equal to or greater than GF. If it is not, then TDELTA is less than 2×AGEOLD and the assigned priority should be 7. The value 7 was entered into GA at step 1608 and at step 1618 this value is saved at some convenient location in the control store.

Returning to step 1612, if TDELTA is equal to or greater than GF then the value 2 is subtracted from GA and the result returned to GA as a new possible priority value. This value is checked to see if it is equal to 1 and if it is not the program loops back to step 1610 where the contents of GF are again multiplied by 2 and returned to GF. This places a value of 4×AGEOLD in GF. At step 1612 another test is made, this time to see if TDELTA is equal to or greater than 4×AGEOLD. If it is not, the program jumps to step 1618 and the value in GA, now 5, is saved in the control store as the priority.

The loop comprising steps 1610, 1612, 1614 and 1616, may be repeated up to three times with the value in GA being reduced by 2 each time the loop is executed. Thus, if on the final run through the loop the test at step 1612 still finds that TDELTA is equal to or greater than GF the value 2 is again subtracted from GA which reduces the priority value therein to 1. This condition is detected at step 1616 and the program proceeds from step 1616 to step 1618 where the priority value of 1 is saved at the convenient location in the control store. This completes computation of a priority value based on the age since first write of the oldest written-to segment in cache.

The second criterion for assigning priority is based on the number of written-to segments in cache. As shown in Table II, a priority of 7 is assigned if the number of written-to segments is less than 25% of the total number of segments in cache. If between 25 and 50% of the segments in cache have been written to, then the assigned priority value is 5. If between 50 and 75% of the segments have been written to, the priority is assigned a value of 3 and if over 75% of the segments have been written to, a priority of 1 is assigned.

Steps 1620–1636 illustrated in FIGS. 16A and 16B compute a priority based on the second criterion. At step 1620, SBGCAP is fetched and divided by 2. SBGCAP is a fixed value representing the maximum possible number of segments in the cache memory. The result obtained by dividing SBGCAP by 2 is stored at GE. In addition, this value is divided by 2 to obtain a value which is stored at GB, this value representing 25% of the total number of segments in the cache memory. GB and GE are added together to obtain a value representing 75% of the cache segments and this value is stored at GC.

At step 1622, SBGWTS is fetched from the staging buffer and stored in GF. SBGWTS represent a count of the number of segments in the cache memory that have not been destaged to a disk device since they were last written to. At step 1624, SBGWTS is compared with the 75% value obtained at step 1620 and if SBGWTS is greater then the value 1 is loaded into GD as a priority value.

If SBGWTS is not greater than the 75% value then at step 1628 it is compared with the 50% value obtained at step 1620. If SBGWTS is greater than the 50% value then the value 3 is entered into GD as a priority value. Finally, if SBGWTS is not greater than the 50% value then it is compared with the 25% value obtained at step 20. If SBGWTS is greater than the 25% value then the value 5 is entered into GD. If the test at step 1632 shows that SBGWTS is not greater than the 25% value then a 7 is entered into GD as the priority value.

At this point the subroutine has completed the computation of the priority value based on the second criterion and this value is contained in GD, having been placed therein at one of the steps 1626, 1630, 1634 or 1636.

At step 1638 the subroutine compares the ageold priority saved at step 1618 with the written-to priority entered into GD at one of the steps 1626, 1630, 1634 or 1636. If the ageold priority is higher than the written-to priority then the program proceeds from step 1638 to step 1640 where the ageold priority is stored at SBTPRI as the trickle priority. On the other hand, if the test at step 1638 indicates that the written-to priority is higher than the ageold priority then at step 1642 the written-to priority is sent to SBTPRI as the trickle priority.

Next, GA is tested at step 1644 and if the first command in the command queue (SBCMQ1) is not to be updated the program returns to the caller.

If the test at step 1644 indicates that SBCMQ1 should be updated, SBTPRI and SBCMQ1 are fetched from the staging buffer. At step 1648 the full bit (bit 4) of SBCMQ1 is tested to see if the first command queue entry is full. If it is not, the new priority is not inserted and the program returns to the calling routine. If the test at step 1648 indicates that the FL bit of the first entry in the command queue is set, the new priority SBTPRI is inserted and SBCMQ1 as thus modified is returned to the staging buffer. The program then returns to the calling routine.

READ UTILITY

Should there be a cache memory failure it is desirable that a host processor be able to reconstruct any data which may have been lost and be able to do this in the least possible time. Essentially, what the host processor needs to know in this case is (1) which of the segments resident in the cache memory had been written to by the host but had not yet been written to the disk at the time of failure and (2) when the oldest of such written-to segments was first written to. As is evident from the foregoing description, the provision of a timestamp in each entry of the timestamp table gives an indication of when each segment was first written to if it has not been destaged. Furthermore, from this table the SCU continuously maintains the parameter TOLDEST and updates this parameter each time a segment is written to or a written-to segment is destaged to a disk in accordance with the timestamps maintained in the timestamp table.

Since a cache memory failure may destroy the contents of the timestamp table, a host processor, in anticipation of the possibility of such a failure, periodically retrieves TOLDEST and saves it with other file recovery synchronization information, e.g. on a system audit trail. In the event of a cache memory failure the host may use the last TOLDEST it retrieved to recover from the failure.

The host processor periodically issues a READ UTILITY command to the storage control unit 100 and the storage control unit retrieves TOLDEST from the RAM and sends it to the host processor. Each time TOLDEST is sent to the host processor it replaces the TOLDEST value read in response to the last previous READ UTILITY command. Thus, by interspersing READ UTILITY commands with the other commands sent to a storage control unit a host processor may always have available a fairly up-to-date indication of how far back in time (i.e. in its program) it must go in its recovery procedure in order to regenerate the data that was lost by the cache memory failure.

Figure 17:
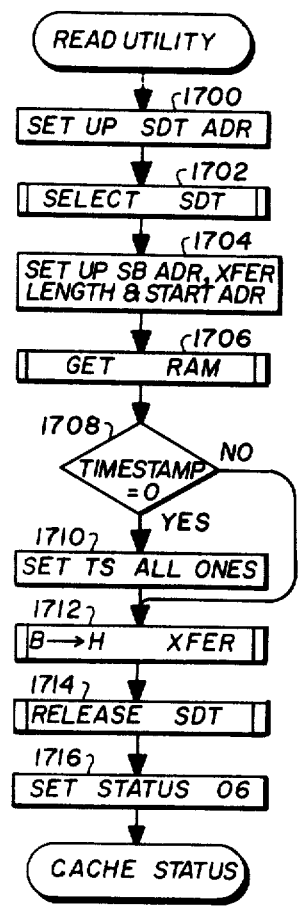

The routine performed in response to the Read Utility command from the host is illustrated in FIG. 17. Actually, the READ UTILITY command may read different parameters from the subsystem in accordance with a subcommand field as fully explained in application Ser. No. 207,152. Only that portion of the Read Utility routine is shown which is executed when the Read Utility command has a subcommand field specifying that the oldest timestamp value should be read.

When the Read Utility command is issued by the host and accepted by the SCU 100 it is loaded into the control store 116 and decoded to find out exactly which subcommand should be executed. When it is determined that the subcommand specifies that the oldest timestamp value is to be read the base address of the SDT in the cache memory 106 is set up and a call is made at step 1702 to select the SDT. This reserves the SDT in the cache memory for the use of the SCU 100 which is making the request. At step 1704 the parameters are set up in preparation for calling a Get Ram subroutine. The parameters are chosen such that only one word will be transferred, this word being transferred from location CDGTSO in the RAM to address 0 in the staging buffer. CDGTSO is the location in RAM of TOLDEST and is the location to which SBGTSO from the staging buffer is transferred when global variables are returned to the RAM.

After TOLDEST is brought into the staging buffer it is then fetched and tested to see if it is zero. If it is not, a buffer-to-host transfer is initiated at step 1710 to transfer the timestamp from location 0 in the staging buffer over bus BD through the channel interface circuits 108 to the requesting host 102.

If the test at step 1708 indicates that the timestamp is equal to zero then the timestamp value in the staging buffer is set to all 1's before the buffer-to-host transfer is initiated.

After the buffer-to-host transfer is completed, a subroutine is called at step 1714 to release the SDT. The SDT is deselected and status action 06 is stored in the control store 116 at location STSXSA. The Read Utility routine then branches to a Cache Status routine which forms a status word and sends it back to the host. The SCU returns to the idle loop after the status word has been sent to the host.

DETERMINING SUBSYSTEM IDLE

In FIG. 11D, at step 1176, a check is made to see if the subsystem is idle. The subsystem is in the idle state if there is no command received from a host processor for some predetermined interval, for example 200 ms. This condition is detected by a trickle timer which functions as follows. The timer is merely a specified location TRKTMR in control store 116. Each time the storage control unit 100 executes an idle loop, TRKTMR is fetched and incremented. The incrementing may take place, for example, as the first step (not shown) of the Idle routine illustrated in FIG. 5 of the present application. Each time a command (EF) is sent to the storage control unit 100 by the host processor and is recognized by the storage control unit, TRKTMR is fetched and reset. This operation may take place as the last step of the Initial Selection routine illustrated in FIG. 68 of application Ser. No. 207,152. The subsystem idle test at step 1176 of the present application merely involves testing the high order of TRKTMR. If it is set then the timer has timed out thereby indicating that the subsystem is in an idle state.

SUMMARY

From the foregoing description it is evident that the device disclosed herein provides a novel method and apparatus for controlling the destaging or trickling of written-to segments from a cache memory having a relatively short access time to a disk memory having a relatively longer access time. The determination of whether or not to trickle, and the priority of trickle, are completely separate from the replacement algorithm (least recently used) used for determining which segments of data must be replaced or deleted to make room for new segments.

The decision to trickle is made by the Check Trickle subroutine during what would otherwise be idle time for the storage control unit. During this subroutine one trickle command may be (but is not necessarily) generated for each command queue. Any segment which has been written to is a candidate for trickling when the subsystem is in an idle state. If the subsystem is not in the idle state then a written-to segment becomes a trickle candidate only if the age since first write of the oldest written-to segment exceeds the threshold age value AGEOLD. The Check Trickle subroutine searches the timestamp table starting at either the oldest entry therein, or the first entry therein that was skipped on a preceding call of the subroutine. The entries in the timestamp table are linked to form a FIFO list. Therefore, of all trickle candidates the ones with the oldest age since first write have trickle commands built first, this being done on a device or command queue basis.

After a trickle command is built it is entered into that command queue which services the device to which a given segment must be trickled. A trickle command then competes with other commands such as those placed therein as a result of a host processor read or write command in the same queue for the right to be executed by the storage control unit. This takes place during execution of the Find Command Queue Entry subroutine (step 604) after the Check Command Queue subroutine (step 502) first determines which command queue, associated with a non-busy device, has a command in its queue.

Trickle commands are assigned priority by the Determine Trickle Priority subroutine which is called by the Find Command Queue Entry subroutine at step 604. The priority of a trickle command is determined by computing a first priority according to age since first write of the oldest written-to segment in the cache memory and computing a second priority based on the percentage of the segments in cache memory that have been written to.

The oldest timestamp in the timestamp table is saved in the cache memory and updated as written-to segments are trickled to the disk drive devices. The host processor periodically reads this oldest timestamp which is saved by the host processor, preferably on a permanent storage medium such as a magnetic tape or disk so that it will not be lost by a power failure which also causes a cache failure. In the event of a cache failure, the host processor may use the last read oldest timestamp value in order to determine what recovery procedures are required.

While a preferred embodiment of the invention has been described in specific detail, it will be obvious to those skilled in the art that various substitutions and modifications may be made in the disclosed embodiment without departing from the spirit and scope of the invention as defined by the appended claims. For example, while the timestamp table has been described as a separate entity, it may be incorporated in the SDT, each entry in the timestamp table becoming two additional words in its corresponding SDT entry. Furthermore, while the preferred embodiment utilizes a clock within a host processor to provide a current timestamp with each cache read or write command, it is contemplated that in other embodiments the clock may be located in the subsystem, for example a cache memory cabinet in which case there is no need to pass a timestamp with each command.

The embodiments of the invention in which an exclusive property or privilege is claimed are defined as follows:

1. In a system having a host processor for issuing read and write commands, a bulk memory, a cache memory and a storage control unit for controlling the transfer of segments of data between said bulk memory and said cache memory, said storage control unit including trickle means for generating trickle commands for controlling the transfer of written-to segments from said cache memory to said bulk memory, the improvement comprising:
first means responsive to a given write command from said host processor for assigning a timestamp value to a segment written to in said cache memory by said given write command when said given write command is the first command to write to said segment after it is transferred to said cache memory from said bulk memory, each assigned timestamp indicating the time of first write to its corresponding written-to segment;
second means for storing a value representing a threshold age at which written-to segments become eligible for trickling if any one of said written-to segments has an age since first write at least as great as said threshold age; and,
third means including means responsive to said first means and said second means for trickling written-to segments from said cache memory to said bulk memory when the age since first write of the oldest written-to segment is at least as great as said threshold age.

2. An improved trickle means as claimed in claim 1 wherein each said write command includes a timestamp value and said first means comprises:
means for storing a table having an entry therein corresponding to each written-to segment in said cache memory;
means for storing the timestamp value in a write command in said table if said write command is the first command to write to a given segment; and,
means for linking the entries in said table in accordance with the sequence in which the timestamp values are entered therein;
said third means being responsive to said second means and the entries in said table for trickling written-to segments from said cache memory to said bulk memory on the basis of age since first write if the age of the oldest written-to segment exceeds said threshold age, the segment with the oldest age since first write being trickled first.

3. An improved trickle means as claimed in claim 2 wherein said bulk memory comprises a plurality of disk drive devices and said system includes means for storing command queues, there being one command queue corresponding to each of said disk drive devices, and said third means further comprises:
trickle command generating means responsive to said second means and said entries in said table for generating a trickle command for one segment when the age since first write of the oldest written-to segment exceeds said threshold age value; and,
means for adding said trickle command to the command queue corresponding to the disk drive device from whence said one segment came.

4. An improved trickle means as claimed in claim 3 wherein commands from said host processor may be added to said command queue, said commands from said host processor including a priority value indicating the relative priority of execution of said commands from said host processor, said trickle means further comprising:
means responsive to said second means and an entry in said table for inserting a priority value into said generated trickle command when the timestamp in the table entry corresponding to said one segment indicates that the age since first write of said oldest written-to segment is at least as great as said threshold age value at the time said trickle command is generated; and,
means for increasing the level of the priority value to be inserted as the age since first write of said oldest written-to segment becomes increasingly larger than said threshold age value.

5. In a system having a host processor for issuing read and write commands, a plurality of disk drive devices, a cache memory, and a storage control unit for controlling the transfer of segments of data between said disk drive devices and said cache memory, a method for trickling written-to segments resident in said cache memory back to the disk drive devices from whence they came, said method comprising:
providing a timestamp in each write command from said host processor, said timestamp representing the time of occurrence of the write command;
storing, for each segment in said cache memory, the timestamp provided with the write command from said host processor which causes the segment to be first written to after being transferred to said cache memory from one of said disk drive devices, to thereby establish a time of first write for each written-to segment in said cache memory;
determining the age since first write of the oldest written-to segment in said cache memory;
establishing a threshold age defining the age since first write at which segments become candidates for trickling;
comparing said threshold age with the age since first write of said oldest written-to segment; and,
trickling written-to segments from said cache memory to said disk drive devices only when the age since first write of the oldest written-to segment is at least as great as said threshold age.

6. The method as claimed in claim 5 wherein the step of trickling segments to said disk drives comprises:
establishing a plurality of command queues, one associated with each of said disk drive devices;
inserting commands for said host processor into said command queues, said commands including a priority value indicating the relative priority of execution of the commands;

building a trickle command for a given written-to segment and inserting it into the command queue associated with the disk drive device from whence said given written-to segment came if said comparison indicates that said age since first write of said oldest written-to segment is at least as great as said threshold age; and, inserting into said trickle command a trickle priority value determined by the relative magnitude of the age since first write of said oldest written-to segment relative to the magnitude of said threshold age, the trickle priority value inserted in said trickle command giving said trickle command a higher priority for execution as the age since first write of said oldest written-to segment becomes increasingly greater than said threshold age.

7. An improved trickle means as claimed in claim 1 wherein each said write command includes a timestamp value.

8. An improved trickle means as claimed in claim 1 and further comprising means for loading a selected threshold age value into said second means at system parameterization time.

9. The method as claimed in claim 6 wherein a plurality of threshold values of different magnitudes are established and the age since first write of said oldest written-to segment is successively compared with the threshold values from the smallest to the largest magnitude, said inserted trickle priority value being determined by the highest magnitude threshold value that said age since first write of said oldest written-to segment is at least as great as.

10. The improvement as claimed in claim 1 wherein said third means includes further means for trickling written-to segments from said cache memory to said bulk memory regardless of the age since first write of said oldest written-to segment, said improvement further comprising:

means for sensing a predetermined period of inactivity during which said host processor issues no commands to said storage control unit, and generating a timeout indication;

means for applying said timeout indication to said third means to enable said further means whereby written-to segments may be trickled from said cache memory to said bulk memory even though the age since first write of said oldest written-to segment is not as great as said threshold age.

11. An improved trickle control means for controlling the trickling of segments of data from a cache memory to a bulk memory comprising:

first means for generating and storing, at the time each segment is first written to, a timestamp value representing the instant in time at which the segment is first written-to;

second means, including a clock, for generating an indication of current time;

third means responsive to said first means and said second means for generating from said timestamp values and said indication of current time signals representing the length of time which has elapsed since the first write to the oldest written-to segment in said cache memory;

fourth means for generating an indication of a threshold elapsed time below which written-to segments are not trickled from said cache memory to said bulk memory; and, fifth means responsive to said third means and said fourth means for controlling the trickling of written-to segments from said cache memory to said bulk memory so that trickling takes place only if the length of time which has elapsed since first write to the oldest written-to segment is at least as great as said threshold elapsed time.

* * * * *

UNITED STATES PATENT AND TRADEMARK OFFICE
CERTIFICATE OF CORRECTION

PATENT NO. : 4,530,055
DATED : July 16, 1985
INVENTOR(S) : James R. Hamstra and L. Hanson It is certified that error appears in the above-identified patent and that said Letters Patent is hereby corrected as shown below:

Column 39, Line 60, delete "the" second occurrence.
Column 40, Line 67, change "for" to -- from --.
Column 41, Line 29, Change "the" to -- said --.

Signed and Sealed this

Fifteenth Day of October 1985

[SEAL]

Attest:

DONALD J. QUIGG

Attesting Officer

Commissioner of Patents and
Trademarks—Designate